United States Patent
Nakamura et al.

(10) Patent No.: US 8,414,303 B2
(45) Date of Patent: Apr. 9, 2013

(54) ROTARY JOINT WIRING UNIT FOR ROBOTS

(75) Inventors: Satoru Nakamura, Kariya (JP);
Kazuyoshi Yanagihara, Oobu (JP);
Naoki Shichida, Tokai (JP)

(73) Assignee: Denso Wave Incorporated, Tokyo (JP)

( * ) Notice: Subject to any disclaimer, the term of this patent is extended or adjusted under 35 U.S.C. 154(b) by 480 days.

(21) Appl. No.: 12/726,005

(22) Filed: Mar. 17, 2010

(65) Prior Publication Data

US 2010/0237178 A1    Sep. 23, 2010

(30) Foreign Application Priority Data

Mar. 17, 2009  (JP) ................................. 2009-064482
Jan. 29, 2010  (JP) ................................. 2010-018580

(51) Int. Cl.
*H01R 39/00*    (2006.01)

(52) U.S. Cl.
USPC ........................................... 439/15; 439/164

(58) Field of Classification Search .................... 439/13, 439/15, 164
See application file for complete search history.

(56) References Cited

U.S. PATENT DOCUMENTS

| 5,219,460 A | * | 6/1993 | Kato et al. ..................... 439/164 |
| 5,655,919 A | * | 8/1997 | Ishikawa et al. ............... 439/164 |
| 7,038,139 B2 |   | 5/2006 | Kanayama et al. |

FOREIGN PATENT DOCUMENTS

| EP | 0 621 112 A1 | 10/1994 |
| JP | A-1-153290   | 6/1989  |
| JP | A-6-143186   | 5/1994  |
| JP | A-10-34588   | 2/1998  |
| JP | A-2003-324835| 11/2003 |

* cited by examiner

*Primary Examiner* — Tho D Ta
(74) *Attorney, Agent, or Firm* — Oliff & Berridge, PLC

(57) ABSTRACT

A wiring unit is provided for robots having a rotary joint. This unit includes a wiring case, a slide aid contained in the wiring case, and a flexible printed wiring board for electric wiring. The wiring case includes a cylindrical housing and a reel with a cylindrical core member. The reel is relatively rotatable to the housing. The reel and housing are linked with robot's two members requiring the rotary joint. In the slide aid, an annular rotary plate surrounds the core member and is rotatable about the core member. Plural rollers are provided on the rotary plate and self-rotatable. The wiring board has electrical wires and is connected to the core member and housing and is wound and unwound in radially inside and outside spaces of the rollers via the vacant space by moving on and along the rollers.

20 Claims, 12 Drawing Sheets

ROTARY JOINT WIRING UNIT FOR ROBOTS

CROSS-REFERENCE TO RELATED APPLICATION

This application is based on and claims the benefit of priority from earlier Japanese Patent Applications No. 2009-064482 filed Mar. 17, 2009 and No. 2010-018580 filed Jan. 29, 2010, the description of which is incorporated herein by reference.

BACKGROUND OF THE INVENTION

1. Technical Field of the Invention

The present invention relates to a rotary joint wiring unit for robots, which is used for providing electric wiring between two members joined by a rotary joint, and in particular, to a rotary joint wiring unit for industrial robots, which uses a flexible printed wiring board for electric connections through the rotary joint.

2. Related Art

Industrial robots are generally provided with a base and a plurality of arms sequentially joined via rotary joints. The end arm of the joined arms has a tip end that is a wrist part on which an end effector (or an actuator), such as a hand, is usually mounted.

A cable is wired in such an industrial robot to supply electric power to motors which serve as drive sources for the arms, the end effector, and the like, and to transmit/receive control signals between the motors and a robot controller. Wiring methods that can be used to wire such a cable include an internal wiring method in which a cable is wired inside the base and the arms, and an external wiring method in which a cable is wired along an outer surface of the robot.

In using either of the above two wiring methods, the wiring structure employed is required to have rotary joints that will not block relative rotation between two members (e.g., base and arm, arm and arm, arm and wrist part, etc.).

Patent documents JP-A-H06-143186 and JP-A-H10-034588 each disclose a wiring structure of a rotary joint using the internal wiring method. In the wiring structure, a cable is wired through the center of rotation of a rotary joint to absorb the relative rotation between two members with the twisting of the cable.

Another patent document JP-A-H01-153290 discloses a wiring structure of a rotary joint using the external wiring method. This wiring structure uses a flexible sheet in which a wiring pattern is formed. The flexible sheet is fixed to two relatively rotating members, bridging therebetween, in the state of being loosened into an arc form. Thus, the relative rotation between the two members is ensured to be absorbed by the arc loosened portion of the flexible sheet.

Although not related to robotic rotary joints, a patent document JP-A-2003-324835 discloses a spiral cable unit that electrically connects the steering wheel of the vehicle with the vehicle body. The spiral cable unit is provided with a casing having an outer cylinder and an inner cylinder which is disposed inside the outer cylinder so as to be rotatable relative to the outer cylinder. The casing accommodates in its interior a band of long flexible flat cable, being wound about the outer periphery of the inner cylinder. One end of the flexible flat cable is connected to the inner cylinder and the other end thereof is connected to the outer cylinder.

With the structure disclosed in JP-A-H06-143186 and JP-A-H10-034588, the relative rotation between the two members is absorbed by the twisting of the cable. Therefore, if the portion corresponding to the center of rotation of a rotary joint for wiring the cable has a small length, the rate of twisting per unit length will be high. The high rate of twisting is likely to hasten damage or disconnection of the cable. Therefore, the portion corresponding to the center of rotation of the rotary joint is required to be elongated. This means that the space required for wiring the cable has to be increased in the direction of the rotation axis of the rotary joint. The increase of such a space will increase the size of the rotary joint, which will be a disadvantage in a small-size robot, in particular, in which a number of parts are closely arranged.

In the structure disclosed in JP-A-H01-153290, the flexible sheet is flexed and extended with the relative rotation between the two members. However, since the force is concentrated in certain areas, fatigue and breakage may be accelerated especially at areas of maximum flexure.

The spiral cable unit disclosed in JP-A-2003-324835 has a structure in which the rotation of a vehicle steering wheel is absorbed by allowing the flexible flat cable to be wound about and unwound from the inner cylinder. Therefore, comparing with the structure using the twisting of a cable, the thickness can be reduced in the direction of the rotation axis of the unit. In addition, the life of the flexible flat cable (hereinafter referred to as "flexible printed wiring board") will be lengthened because no local flexing and extending motion is imparted.

However, since the steering wheel of a vehicle is manipulated by a person, the speed of rotation is relatively slow and the wheel rotation is usually only maintained for a short time. On the other hand, when robotic arms are concerned, the speed of rotation of the arms is much higher than the speed of rotation of a steering wheel. Moreover, industrial robots are operated for a long time, which may continue as long as twenty-four hours. Thus, the spiral cable unit disclosed in JP-A-2003-324835, while suitable for absorbing the rotation of a steering wheel of a vehicle, is not configured assuming high-speed and long-duration rotation. Accordingly, it is expected that use of the flexible printed wiring board in a robotic rotary joint may problematically hasten wearing or the like. Thus, the flexible printed wiring board cannot be applied, as it is, to a robotic rotary joint.

SUMMARY OF THE INVENTION

The present invention has been made in light of the problem mentioned above, and has as its object to provide a rotary joint wiring unit for robots, which wiring unit employs a structure for preventing early wearing to thereby lengthen the life of the wiring unit in the case where the wiring unit is configured using a flexible printed wiring board.

In order to achieve the object, the present invention provides a wiring unit for robots having a rotary joint with which two members are mutually rotatably coupled, an electronic wiring passing the two members and the rotary joint. The wiring unit includes a wiring case, a slide aid, and a flexible printed wiring board. Of these components, the wiring case includes i) a cylindrical housing whose both ends are opened in an axial direction of the housing and ii) a reel i) having a cylindrical core member located in an inner space of the housing and the reel comprising two lid members mutually integrated with the core member and located on both axial end sides of the inner space of the housing, and ii) being relatively rotatable to the housing, the housing and the reel respectively being linked with the two members of the robot. The slide aid includes an annular rotary plate i) having both ends which produce a vacant space therebetween, ii) being placed to surround the core member in a radial direction of the housing, and iii) being rotatable about the core member, and a plurality of rollers provided on the rotary plate to be located around the core member and rotatable about an axis thereof. The flexible printed wiring board (14) is belt-shaped. In this flexible printed wiring board, a plurality of electrically conductive wires for the electrical wiring are contained with electrical insulation therebetween, and which has i) two length-width end portions one of which is linked with the core member and the other of which is linked with the housing and ii) a rest portion other than the two length-width end portions, which is located within the inner space of the housing, is wound and unwound in inside and outside spaces of a set of the rollers in the radial direction via the vacant space such that that the rest portion is moved on and along the rollers and is wound and unwound oppositely in directions between the inside and the outside spaces of the set of the rollers in the radial direction.

With this configuration, when the first and the second member relatively rotate, the flexible printed wiring board moves such that it comes into contact with the rollers of the slide aid so as to be wound about and unwound from the core member and the slide aid, while allowing the rollers to rotate. Therefore, the flexible printed wiring board can move duly following the high-speed relative rotation of the first and second members of the robot. Moreover, the flexible printed wiring board will not be entangled or worn out excessively quickly, will satisfactorily endure periods of operation of the robot.

For example, each of the rollers has an outer diameter and the rotary plate has a width in the radial direction and the outer diameter is larger than the width. Thus, the flexible printed wiring board can be prevented from being worn out by being in contact with the rotary plate.

It is preferred that, in the foregoing configurations, the flexible printed wiring board is folded back into the vacant space produced by the rotary plate so that the flexible printed wiring board has an arc folded-back portion which changes a winding direction thereof in the vacant space, and a roller among the plurality of rollers is provided at one end of both ends of the rotary plate, the arc folded-back portion being wound around the one end of both ends of the rotary plate, and the unit further includes a protective pole provided at the other end of both ends of the rotary plate, wherein the protective pole has an arc concave surface which faces and accepts the arc folded-back portion for protecting the arc folded-back portion.

Thus, when the first and second members of the robot relatively rotate in the direction of allowing the portion of the flexible printed wiring board outside the slide aid to be wound about the slide aid, the flexible printed wiring board in the arc fold-back portion comes into contact with the roller concerned to pull the slide aid. As a result, the slide aid will rotate about the core member.

On the other hand, when the first and second members of the robot relatively rotate in the direction of allowing the portion of the flexible printed wiring board outside the slide aid to be unwound from the slide aid, the flexible printed wiring board in the arc fold-back portion comes into contact with the arc concave surface of the protective pole to push the protective pole. As a result, the slide aid will efficiently receive the pressing force of the flexible printed wiring board and smoothly rotate about the core member.

The protective pole may be biased outward in the axial direction on the rotary plate. Thus, the flexible printed wiring board can be prevented from being pulled into the gap between the protective pole and the core member.

It is preferred that the wiring unit further includes a projection fixedly located between two mutually adjacent rollers among the plurality of rollers, wherein the two rollers are located from one end of both ends of the rotary plate and composed of a first roller and a second roller in this order from the one end, and the flexible printed wiring board has an arc folded-back portion which changes a winding direction thereof around the two rollers. In this configuration, the arc folded-back portion of the flexible film board is located between the projection and the second roller and the flexible printed wiring board layers are located around the first roller via the vacant space produced between both ends of the rotary plate. Therefore, the flexible film board is first wound around the second roller before the flexible printed wiring board layers are wound around the first roller in response to a relative rotation between the reel and the housing to have the flexible printed wiring board wound around the rollers. In contrast, the flexible film board is first touched to the projection before the arc folded-back portion of the flexible printed wiring board is made to touch a roller provided on the other end of the rotary plate by being unwound, in response to a relative rotation between the reel and the housing to have the flexible printed wiring board unwound around the rollers.

With this configuration, the flexible printed wiring board will no longer be wound about the rollers of the slide aid or be in contact with the end of the slide aid. Therefore, the flexible printed wiring board can be prevented from being worn out. At the same time, with the above configuration, sliding properties similar to the ones set forth above can also be realized.

Preferably, the protrusion has a side to which the arc folded-back portion of the flexible film board is made to touch and the side of the protrusion has an arc concave surface to accept the arc folded-back portion. Thus, when the flexible printed wiring board in the arc fold-back portion comes into contact with the arc concave surface of the drive projection to push the drive projection, the slide aid will efficiently receive the pressing force of the driving film sheet and smoothly rotate about the core member.

As another preferred example, the plurality of rollers include a roller provided on one end of both ends of the rotary plate, the flexible printed wiring board being folded back from the radial inside of the set of rollers to the radial outside of the set of rollers around the roller provided on the one end. In this case, the wiring unit further includes two protective rollers provided on the other end of both ends of the rotary plate, the two protective rollers aligning in a width direction of the rotary plate, each of the protective rollers being cylindrical and having a radius smaller than the radius of each of the rollers.

Thus, when the flexible printed wiring board is unwound, the flexible printed wiring board in the arc fold-back portion is ensured to contact and push the two protective rollers. Therefore, the wearing of the flexible printed wiring board can be further reduced.

Still preferably, the two protective rollers consist of a first protective roller located outward in the radial direction and a second protective roller located inward in the radial direction and the two protective rollers are located such that the first protective roller first touches the arc folded-back portion and the second protective roller then touches the arc folded-back portion.

With this configuration, the flexible printed wiring board in the arc fold-back portion, when it first comes into contact with the outer protective roller, will be driftingly drawn to the inner peripheral side. Therefore, the flexible printed wiring board in the arc fold-back portion is unlikely to be pulled into the gap between the outer protective roller and the housing. Thus, the fold-back portion can be prevented from being pulled into the above gap.

DETAILED DESCRIPTION OF THE PREFERRED EMBODIMENTS

With reference to the accompanying drawings, hereinafter will be described some embodiments of the present invention.

First Embodiment

Referring to FIGS. 1 to 11, hereinafter will be described a first embodiment of the present invention.

Figure 1:
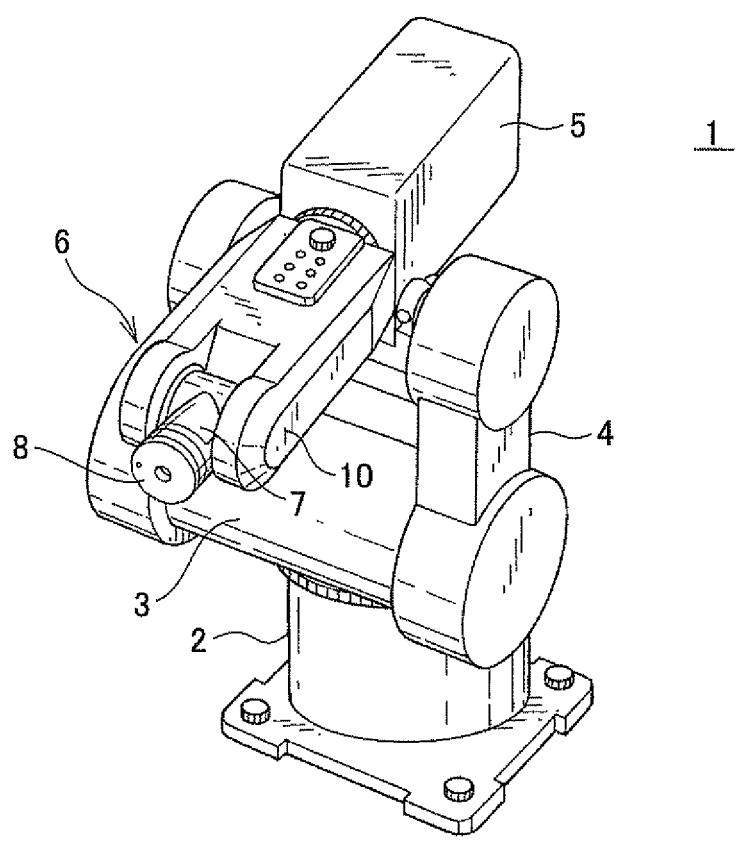
FIG. 1 is a perspective view illustrating an industrial robot to which embodiments of the present are applied.

FIG. 1 illustrates an industrial robot 1 in which a rotary joint according to the present invention is put into practice. The industrial robot 1 is configured, for example, as a vertically articulated six-axis robot. The industrial robot 1 includes a base 2, shoulder 3, lower arm 4, upper-rear arm 5, upper-front arm 6, wrist 7 and flange 8. The base 2 is set up on a floor. The shoulder 3 is supported by the base 2 so as to be pivotably movable in the horizontal direction. The lower arm 4 is supported by the shoulder 3 so as to be pivotally movable in the vertical direction. The upper-rear arm 5 is supported by the lower arm 4 so as to be pivotally movable in the vertical direction. The upper-front arm 6 is supported by the upper-rear arm 5 so as to be twistingly rotatable. The wrist 7 is supported by the upper-front arm 6 so as to be pivotally movable in the vertical direction. The flange 8 is supported by the wrist 7 so as to be twistingly rotatable. The flange 8, or an arm end, is configured to be attached with an end effector (i.e., an actuator; not shown), such as a hand.

Besides a hand, a camera of a visual checking device may be attached as an end effector. The visual checking device refers to a device that picks up an image of a desired checking point of a piece of work, transmits the image to a robot controller and displays the image received by the robot controller. Good or bad assembly, processing and the like are checked based on the image visually indicated on the display.

Thus, rotary joint structures are provided, in which respective rotatable supports are achieved, i.e. rotatable support of the shoulder 3 by the base 2, rotatable support of the lower arm 4 by the shoulder 3, rotatable support of the upper-rear arm 5 by the lower arm 4, rotatable support of the upper-front arm 6 by the upper-rear arm 5, rotatable support of the wrist 7 by the upper-front arm 6, and rotatable support of the flange 8 by the wrist 7.

Figure 2:
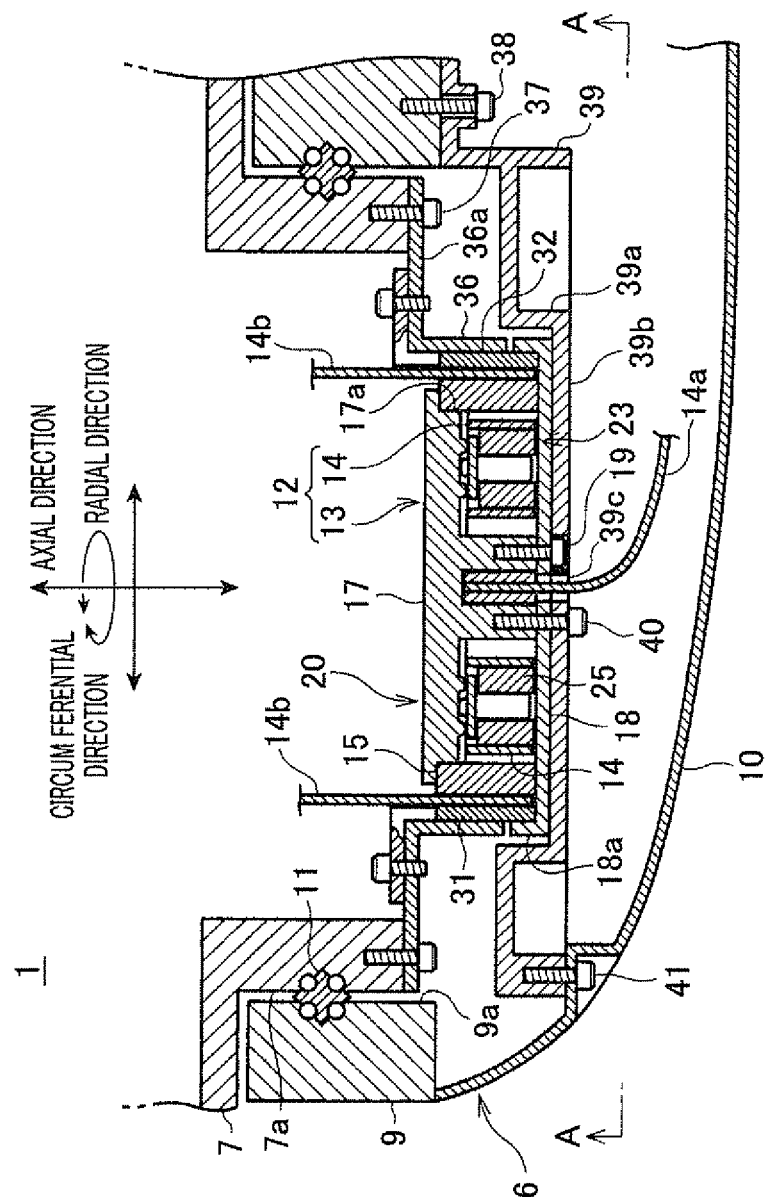
FIG. 2 is a horizontal cross-sectional view illustrating a rotary joint wiring unit together with a rotary joint structure, according to a first embodiment of the present invention.

Of these rotary joint structures, FIG. 2 shows the rotary joint structure of the wrist 7 for the upper-front arm 6. As shown in FIG. 2, the upper-front arm 6 is configured to have an arm base frame 9 which is covered with a plurality of outer covers 10. The arm base frame 9 of the upper-front arm 6 has a tip end portion in which a shaft hole 9a is formed. Meanwhile, the wrist 7 is provided with a projected cylindrical shaft portion 7a. The shaft portion 7a is fitted to the shaft hole 9a of the arm base frame 9 of the upper-front arm 6 and supported by a cross roller bearing 11 to enable relative rotation. In such a rotary joint structure, the wrist 7 is supported by the upper-front arm 6 so as to be pivotally movable in the vertical direction. The similar structure is applied to the rotary joints of other robotic elements, such as the shoulder 3, lower arm 4, upper-rear arm 5 and flange 8.

The shoulder 3, lower-arm 4, upper-rear arm 5, upper-front arm 6, wrist 7 and flange 8, which are pivotally movable or twistingly rotatable robotic elements, each have an actuator, e.g., servomotor (not shown), as a drive source. An electric cable (not shown) is wired inside the robot, extending from the base 2 to the wrist 7, the tip end, for the purposes of supplying power to the servomotors, or transmitting control signals from the robot controller to the drive circuits of the respective servomotors, or transmitting rotation sensing signals from the rotary encoders of the respective servomotors to the robot controller.

In the case where the end effector attached to the flange 8 is a hand, an electric cable is wired in the robot for the purposes of supplying power to the servomotor, i.e. actuator, of the hand, or transmitting/receiving control signals or rotation sensing signals between the servomotor of the hand and the robot controller. In the case where the end effector is the camera of a visual checking device, an electric cable is wired in the robot for the purposes of supplying power to the camera, or transmitting pickup image signals of the camera to the robot controller.

Figure 3:
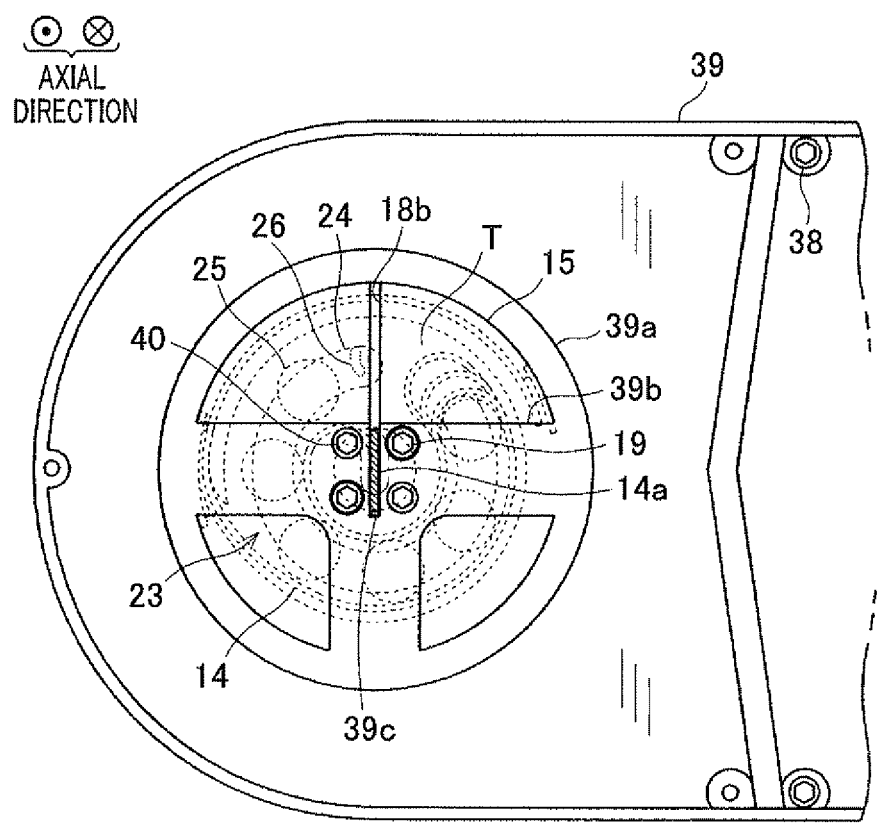
FIG. 3 is a side view illustrating a mounting frame with an outer cover detached, as viewed along an A-A line of FIG. 2.
Figure 4:
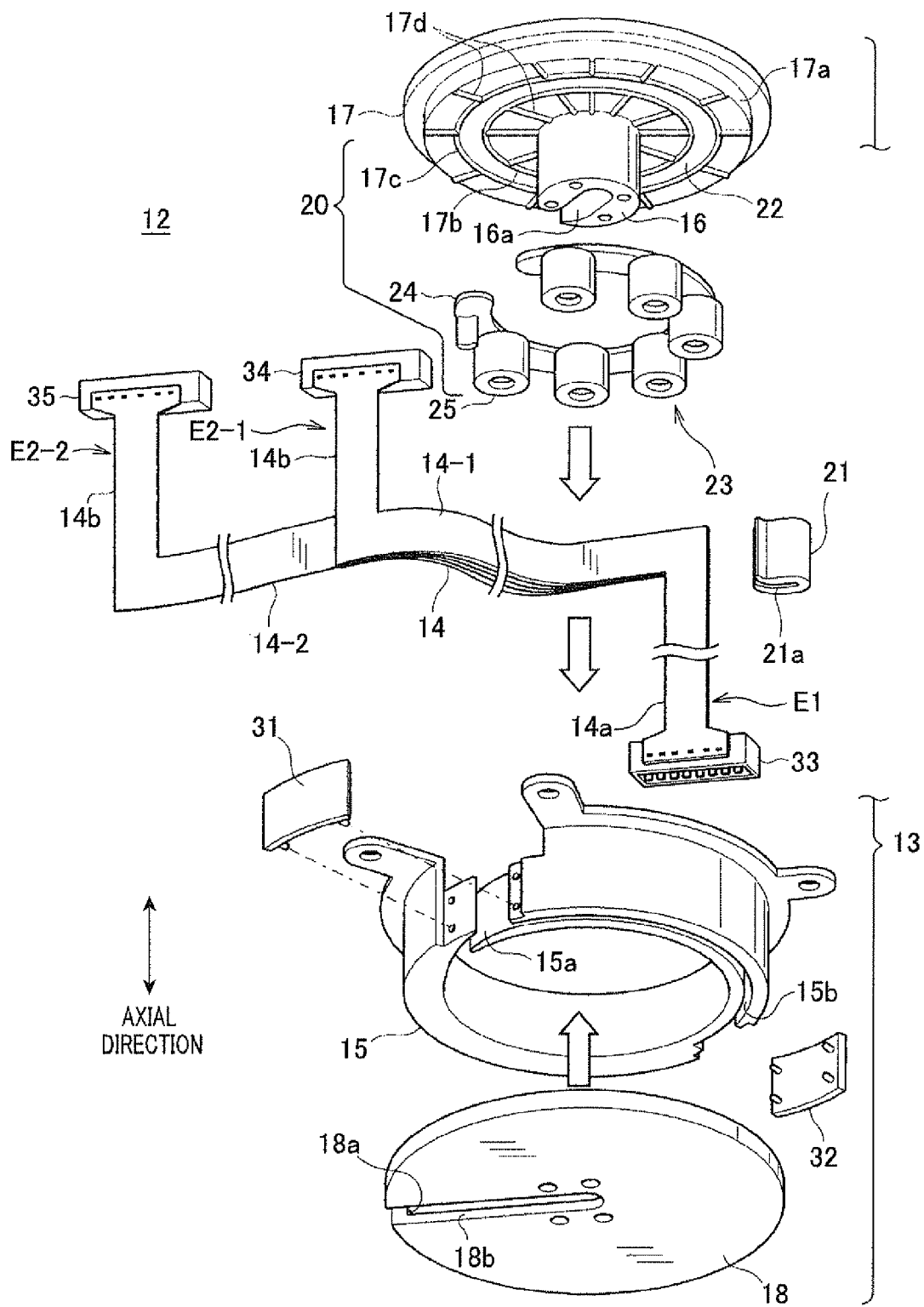
FIG. 4 is an exploded perspective view of the rotary joint wiring unit.

In the wiring that is the cable wired in the robot, a rotary joint wiring unit 12 shown in FIGS. 2 to 4 is used for the wiring through a rotary joint. The rotary joint wiring unit 12 shown in FIGS. 2 to 4 is used for the rotary joint of the wrist 7. Wiring units used for other rotary joints have the similar configuration. The rotary joint wiring unit 12 is configured with a wiring case 13 and a band of long flexible printed wiring board assembly 14 accommodated in the wiring case 13.

In the following description, the flexible printed wiring board assembly 14 is referred to as "FPC board assembly 14".

The wiring case 13 of the rotary joint wiring unit 12 includes a cylindrical housing 15, a first disc 17 and a second disc 18. The cylindrical housing 15 is shaped into an approximately cylindrical appearance, so that, using this housing 15, an axial direction, a radial direction and a circumference direction can be defined as shown in FIGS. 2-4. This cylindrical housing 15, which is made of transparent plastic, has a cylindrical bore (i.e., inner space), and both axial ends are open.

The first disc 17 is made of transparent plastic and is integrally provided with an approximately cylindrical core member 16 at its center portion. The second disc 18 is also made of transparent plastic.

The first and second discs 17 and 18 are used for closing both of the open ends of the housing 15 in the axial direction. The first disc 17 has a circular fitting projection 17a to be fitted to the inner side of the housing 15. The second disc 18 has an annular fitting rib 18a to be fitted to the outer side of the housing 15. The second disc 18 is fixed to the core member 16 of the first disc 17 by a screw 19 shown in FIG. 8, for integration with the first disc 17. The integrated first and second discs 17 and 18 constitute a reel 20 having the core member 16 at the center.

In constituting the reel 20 by integrating the first and second discs 17 and 18, the circular fitting projection 17a is fitted to the inner side of the housing 15, while the annular fitting rib 18a is fitted to the outer side of the housing 15. Thus, the first and second discs 17 and 18 are arranged sandwiching the housing 15.

In this case, very small gaps are ensured to be formed between the housing 15 and the first disc 17 and between the housing 15 and the second disc 18. The housing 15 and the reel 20 are assembled in this way, enabling relative rotation therebetween, to constitute the wiring case 13.

The core member 16 located at the center portion of an imaginary plane perpendicular to the axial direction of the housing 15 is provided with a holding groove 16a into which a stopper 21 having an insertion groove 21a is fitted. On the other hand, the housing 15 is provided with a slit 15a that draws an arc from the inner peripheral surface of the housing 15 toward the outer peripheral surface thereof. The housing 15 is also provided with a deep groove 15b that unidirectionally extends from the slit 15a to the opposite side. At the tip end portion of the deep groove 15b, the outer sidewall portion of the groove is left open to the outside at the outer peripheral surface of the housing 15, while the bottom face portion of the groove is also left open to the outside at the end surface of the housing 15.

The first disc 17 has an inner surface (the surface that constitutes an inner surface of the wiring case 13) in which two annular ribs 17b and 17c with different diameters are formed so as to be coaxial with the core member 16. An annular groove sandwiched between the two annular ribs 17b and 17c serves as a guide groove 22. The inner surface of the first disc 17 is also provided with a plurality of radial ribs 17d extending radially from the core member 16. The radial ribs 17d are not formed inside the guide groove 22.

Figure 9:
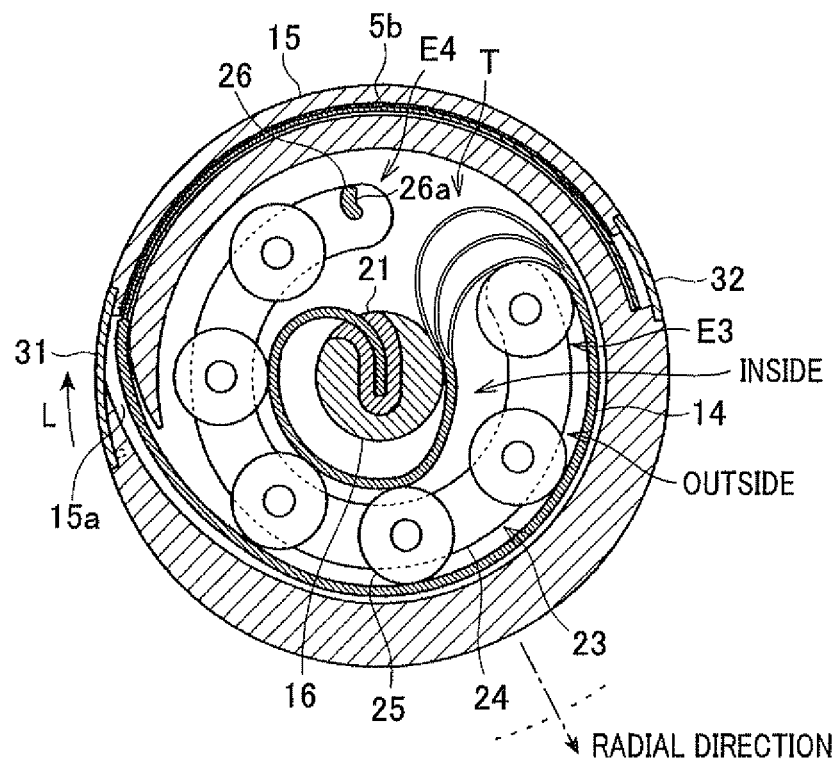
FIG. 9 is a vertical cross-sectional view illustrating the body of the rotary joint wiring unit.

The wiring case 13 is provided in the interior thereof with a slide aid 23. The slide aid 23 has, as a base, an annularly shaped rotary plate 24 made of plastic. The rotary plate 24 has an incomplete annular shape and thus has ends E3 and E4 as shown in FIG. 9, for example, forming an opening therebetween. One of two opposing surfaces of the rotary plate 24 is provided with a projection 24a. The other surface of the rotary plate 24 is provided with a row of a plurality of upright support shafts 24b along the arc of the rotary plate 24. The rotary plate 24 is also provided with rollers 25 which are rotatably supported by the respective support shafts 24b. Each roller 25 is ensured to have an outer diameter larger than the width of the rotary plate 24, so that each roller 25 sticks out of the inner and outer peripheral edges of the rotary plate 24.

In the vicinity of the end E4 on the surface of the rotary plate 24 where the support shafts 24b are uprightly provided, a protective pole 26 is uprightly provided. The protective pole 26 has an arc concave surface 26a that faces the end E3. The protective pole 26 has a width smaller than the width of the rotary plate 24. For example, the width of the protective pole 26 is set to approximately half of that of the rotary plate 24. The protective pole 26 is provided at a position deviated to the side of the outer peripheral edge of the rotary plate 24. At the end E3 of the rotor 24, which end is opposite to the end E4 where the protective pole 26 is uprightly provided, a roller 25 is positioned. The roller 25 concerned sticks out more outer side than at the end E4 of the rotary plate 24.

Thus, the slide aid 23 is configured by arranging the plurality of rollers 25 on the rotary plate 24. As shown in the enlarged view of FIG. 8, the slide aid 23 is accommodated in the wiring case 13 so that the projection 24a of the rotary plate 24 is slidably fitted to the guide groove 22 of the first disc 17. By allowing the projection 24a of the rotary plate 24 to slidably fit to the guide groove 22, the slide aid 23 is ensured to be rotatably movable about the core member 16 and centered thereon.

Figure 7:
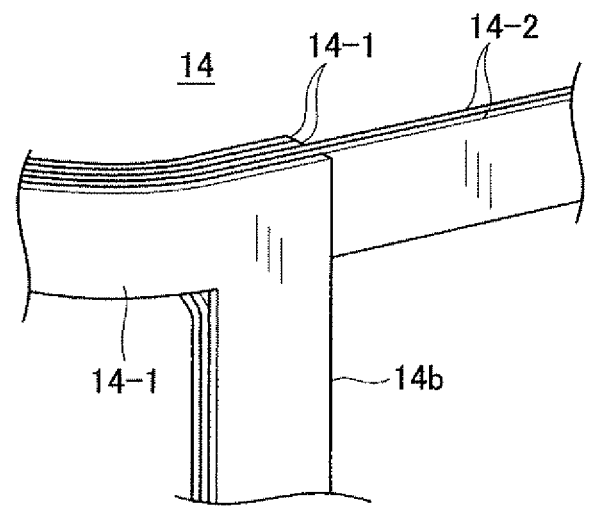
FIG. 7 is a partial perspective view of the plurality of FPC boards in the state of being laid one over the other.
Figure 8:
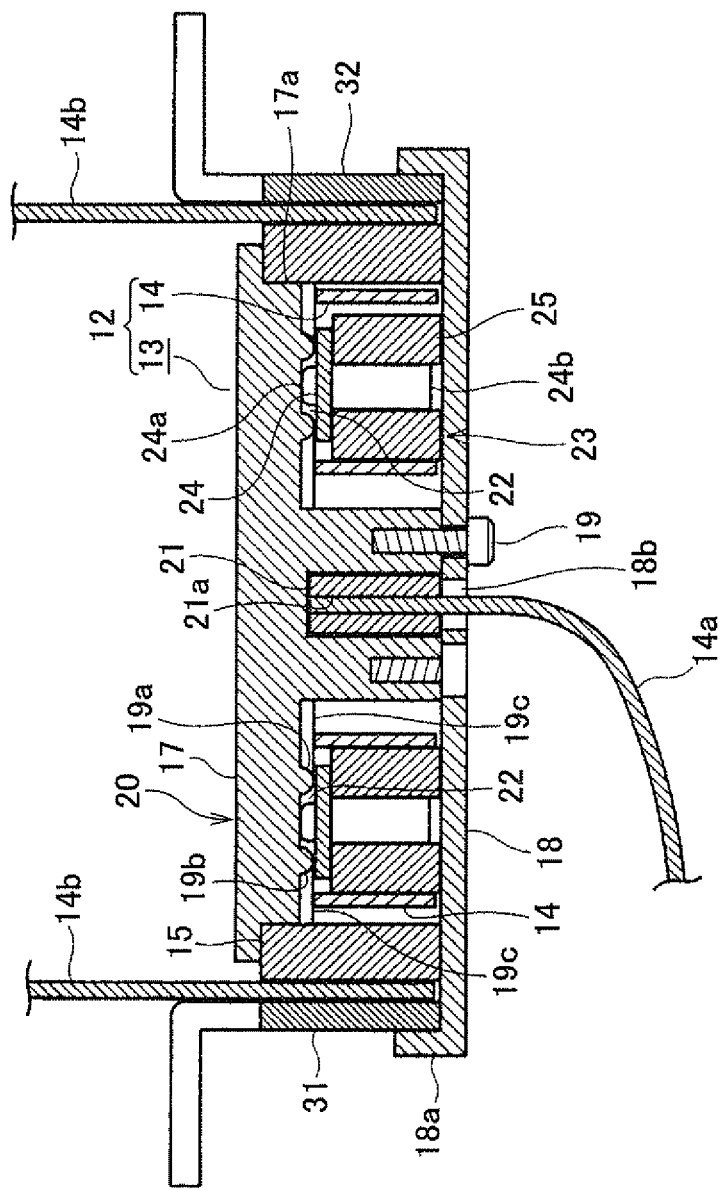
FIG. 8 is a horizontal cross-sectional view illustrating a body of the rotary joint wiring unit.

As also shown in FIG. 7, the FPC board assembly 14 is provided with a plurality of power and signal FPC boards (sheets) 14-1 and 14-2 (described later) laid one over the other and accommodated in the wiring case 13.

Figure 5A:
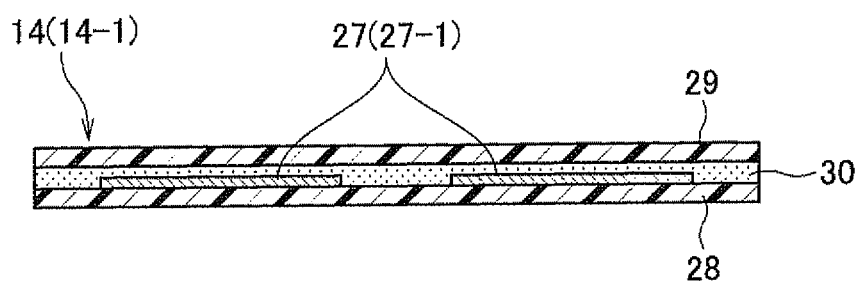
FIGS. 5A and 5B are enlarged cross-sectional views each illustrating a flexible printed wiring board (FPC board) used in the rotary joint wiring unit.
Figure 5B:
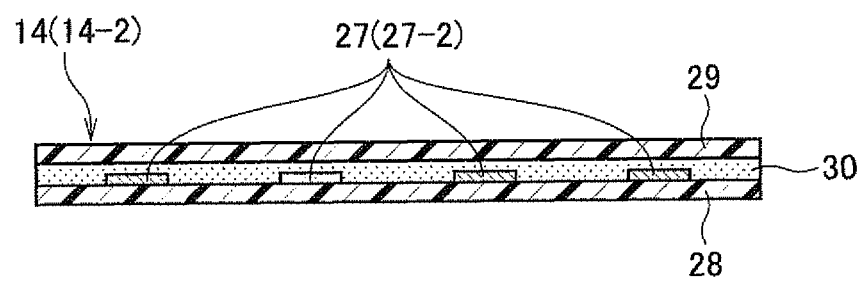

As shown in FIGS. 5A and 5B, these FPC boards 14-1 and 14-2 are each basically configured with adhering a plastic film, such as a polyimide film 28, in which a plurality of electrically conductive lines 27 are formed, to a plastic film, such as a polyimide film 29, as an insulation coating, using an adhesive 30. The conductive lines 27 are used as power lines or signal lines. Thus, two types of FPC boards 14 are prepared. One type is the power FPC board 14-1 in which the conductive lines 27 are used as power lines 27-1 as shown in FIG. 5A.

The other type is the signal FPC board 14-2 in which the conductive lines 27 are used as signal lines 27-2 as shown in FIG. 5B. Each power line 27-1 and each signal line 27-2 have the same thickness, however, and the width of the latter is smaller than that of the former.

In the present embodiment, the power FPC board 14-1 plays a role of supplying power to the servomotors that are actuators (drive sources) of the wrist 7, flange 8 and the like, and of supplying power to the end effector. The signal FPC board 14-2 plays a role of transmitting/receiving signals between the servomotors and the robot controller, and of transmitting/receiving signals between the end effector and the robot controller.

In effect, the FPC board assembly 14 is provided with a predetermined number of the power FPC boards 14-1 and a predetermined number of the signal FPC boards 14-2. In laying the plurality of FPC circuit boards 14-1 and 14-2 one over the other, it is ensured that the signal FPC boards 14-2 are sandwiched between the power FPC boards 14-1. These FPC boards may be laid in various ways.

Figure 6A:
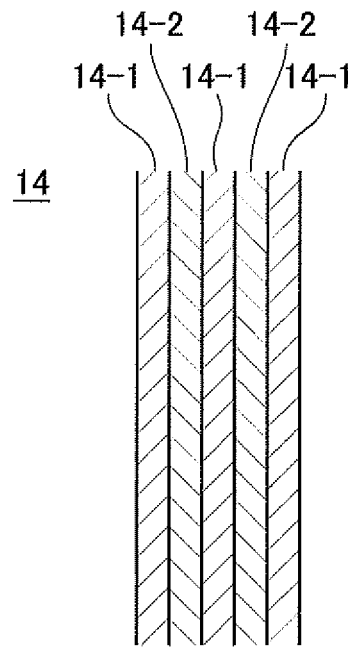
FIGS. 6A and 6B are cross-sectional views each illustrating a plurality of the FPC boards in the state of being laid one over the other.
Figure 6B:
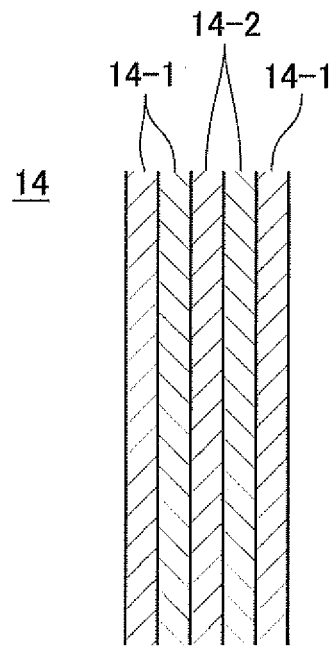

For example, as shown in FIG. 6A, the signal FPC board 14-2 may each be sandwiched by two single power FPC boards 14-1. Alternatively, as shown in FIGS. 6B and 7, a plurality of the single FPC boards 14-2 may be collectively sandwiched by the power FPC boards 14-1. As shown in FIG. 4, the power FPC board 14-1 and the signal FPC board 14-2 have a different length. Specifically, the signal FPC board 14-2 is made longer than the power FPC board 14-1. These two types of FPC boards 14-1 and 14-2 of different length are laid one over the other with the end portions on one side (hereinafter collectively referred to as "end E1") being aligned. Accordingly, the end portions of the long signal FPC boards 14-2 on the other side (hereinafter collectively referred to as "end E2-2") are allowed to further extend from the end portions of the short power FPC boards 14-1 on the other side (hereinafter collectively referred to as "end E2-1"). At the one end E1, the justified end portions of the two types of FPC boards 14-1 and 14-2 are adhered to each other, while at the other ends E1-1 and E2-2, the justified end portions of the two types of FPC boards 14-1 and 14-2 are adhered to each other, (though not shown in FIG. 4). However, it should be appreciated that these FPC boards 14-1 and 14-2 may not necessarily be adhered to each other.

The ends E1, E2-1 and E2-2 of the FPC board assembly 14 are connected to the core member 16 and the housing 15. Specifically, the justified end portions of the FPC boards 14-1 and 14-2 (i.e. the end E1 of the of FPC board assembly 14) are inserted into and held by the insertion groove 21a of the stopper 21 which is fitted to the core member 16. Meanwhile, the portion of the FPC boards extending from near the end portions of the short power FPC boards 14-1 to the end portions of the long signal FPC boards 14-2 (i.e. the portion of the FPC board assembly 14 extending from near the end E2-1 to the end E2-2) is entirely inserted into the slit 15a and the deep groove 15b that continues from the slit 15a. Thus, this portion of the FPC boards closes the opening of the slit 15a on the outer peripheral side and the opening of the deep groove 15b at the tip end on the outer peripheral side, being held by pressers 31 and 32 that are fixed to the housing 15.

As also shown in FIG. 9, the FPC board assembly 14, with the ends E1, E2-1 and E2-2 being connected to the core member 16 and the housing 15, is wired through the opening between the ends E3 and E4 of the slide aid 23 (rotary plate 24) so that an intermediate portion of the FPC board assembly 14 is located at the opening. In the wiring, a portion of the FPC board assembly 14 located inside the slide aid 23 is wound about the core member 16 by a predetermined number of times, while a portion of the FPC board assembly 14 located outside the slide aid 23 is wound about the slide aid 23 by a predetermined number of times in a direction reverse of the winding direction of the FPC board assembly 14 inside the slide aid 23.

Thus, the FPC board assembly 14 is wound in opposite directions on the inner and outer sides of the slide aid 23. Accordingly, the FPC board assembly 14 is folded back forming a U-shape at the opening between the ends E3 and E4 of the slide aid 23 (rotary plate 24). Inside the U-shaped folded back portion T (hereinafter referred to as "fold-back portion T"), the roller 25, as mentioned above, is provided at the end E3 of the rotary plate 24.

Figure 10:
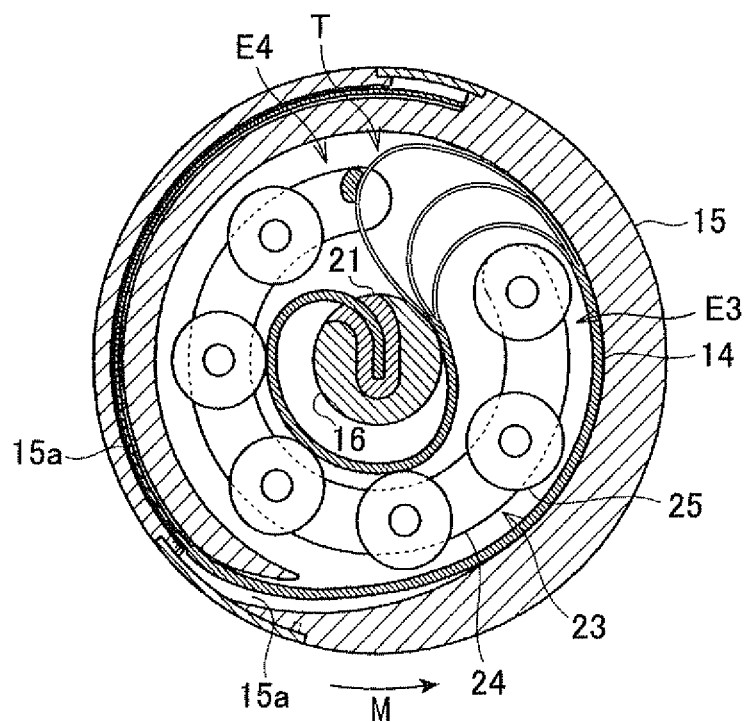
FIG. 10 is a vertical cross-sectional view illustrating the body of the rotary joint wiring unit in a state different from the one illustrated in FIG. 9.
Figure 11:
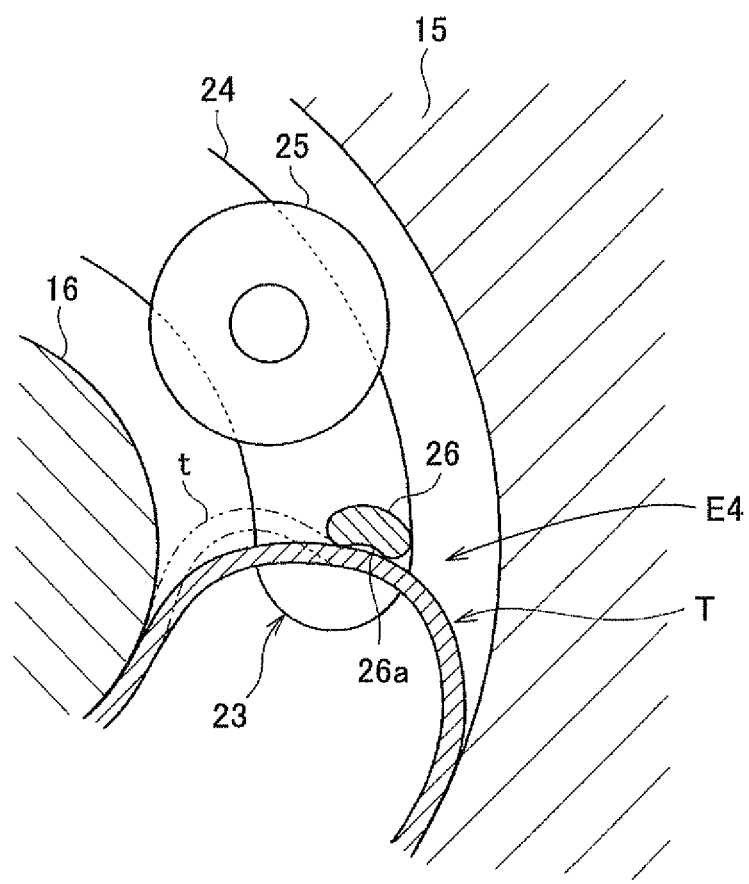
FIG. 11 is an enlarged cross-sectional view illustrating the function of a protective pole.

Although five FPC boards 14-1 and 14-2 are drawn in FIGS. 6A, 6B and 7, only three of these components are drawn in FIGS. 4, 9 and 10 for the sake of brevity.

As shown in FIG. 4, the ends E1, E2-1 and E2-2 of the FPC board assembly 14 are formed into extensions 14a and 14b. Each of the extensions 14a and 14b extends perpendicular to the FPC board assembly 14. The extension 14a formed at the end E1 of the FPC board assembly 14 and connected to the core member 16 has a tip end to which a connecting terminal 33 is attached for establishing connection with the conductive lines 27 of the FPC board assembly 14. The extensions 14b formed at the ends E2-1 and E2-2 of the FPC board assembly 14 and connected to the housing 15 have respective tip ends to which connecting terminals 34 and 35 are attached, respectively.

The extension 14a formed at the end E1 of the FPC board assembly 14 and connected to the core member 16 is wired through a slit 18b linearly formed in the second disc 18 so as to extend from the outer periphery of the second disc to the center portion thereof, and drawn out of the wiring case 13. The extension 14b formed at the end E2-1 of the FPC board assembly 14 is wired through a portion of the slit 15a, which portion is not closed by the first disc 17, and drawn out of the wiring case 13. The extension 14b formed at the end E2-2 of the FPC board assembly 14 is drawn out of the wiring case 13 from the opening at the bottom surface portion (on the side of the first disc 17) of the tip end portion of the deep groove 15b.

The FPC boards 14-1 and 14-2, as far as they are located inside the wiring case 13, are left unadhered to each other so as to be slidably movable. As also shown in FIG. 9, the length of the boards 14-1 and 14-2 in the unadhered portion is set so that the FPC board 14-1 or 14-2, as it is located more outer side in the U-shaped fold-back portion T at the opening of the slide aid 23, will have a larger length. Thus, the FPC boards 14-1 and 14-2 located in the fold-back portion T will be separated from each other with a space being formed therebetween.

The rotary joint wiring unit 12 is configured as described above. Hereinafter will be described an example of a procedure for assembling the rotary joint wiring unit 12.

First, the plurality of FPC boards 14-1 and 14-2, which are for the FPC board assembly 14, are laid one over the other so that the end portions are adjusted on one side (end E1). Then, the adjusted end portions at the end E1 are adhered to each other. Also, the end portions of the short FPC boards 14-1 at the end E2-1 are adhered to each other, while the end portions of the long FPC boards 14-2 at the end E2-2 are also adhered to each other. Subsequently, the connecting terminals 33, 34 and 35 are connected to the tips of the extensions 14a and 14b provided at the ends E1, E2-1 and E2-2, respectively.

Meanwhile, the first disc 17 is placed on a workbench and then the housing 15 is placed on the first disc 17 so as to be fitted to the circular fitting projection 17a. Subsequently, the slide aid 23 is accommodated in the housing 15 such that the projection 24a of the rotary plate 24 of the slide aid 23 is fitted to the guide groove 22 of the first disc 17.

After that, the end E1 of the PCT board assembly 14 is inserted into the insertion groove 21a of the stopper 21, followed by fitting the stopper 21 to the holding groove 16a of the core member 16. Then, the FPC board assembly 14 inside the slide aid 23 is loosely wound about the core member 16 by a predetermined number of times, wired through the opening between the ends E3 and E4 of the slide aid 23, and drawn out of the slide aid 23. Then, the FPC board assembly 14 is folded back and wound about the slide aid 23 by a predetermined number of times in a direction reverse of the winding direction of the FPC board assembly 14 inside the slide aid 23.

Then, the extension 14b at the end E2-1 of the FPC board assembly 14 is led into the slit 15a of the housing 15 from the outer peripheral side. Meanwhile, the extension 14b at the end E2-2 of the FPC board assembly 14 is led into the inside of the tip end portion of the deep groove 15b from the outer peripheral side opening of the housing 15. Then, the portion extending from the end E2-1 to the end E2-2 is inserted from above into the slit 15a and the deep groove 15b. Thus, the extensions 14b at the ends E2-1 and E2-2 are brought into the state of being drawn out to the side of the first disc 17 from the tip end to portions of the slit 15a and the deep groove 15b.

Then, the second disc 18 is arranged on the housing 15 such that the extension 14a drawn out upward from the core member 16 is inserted into the slit 18b from the outer peripheral side toward the center side to thereby fit the annular fitting rib 18*a* to the outer periphery of the housing 15. Finally, the second disc 18 is fixed to the core member 16 by the screw 19. Thus, the rotary joint wiring unit 12 has been assembled.

As shown in FIG. 2, after attaching the housing 15 to a metal holding cylinder 36, the wiring case 13 accommodating the FPC board assembly 14 is arranged at a rotary joint. In arranging the wiring case 13, the center of the relative rotation between the housing 15 and the reel 20 is ensured to align with the center of the relative rotation between the wrist 7 and the upper-front arm 6. The holding cylinder 36 is provided with a flange 36*a* which is fixed to the shaft portion 7*a* of the wrist 7, for example, by a screw 37. Thus, the housing 15 is fixed to the wrist 7 (one mating member for the relative rotation of the robot) via the holding cylinder 36.

The wiring case 13, with the housing 15 being fixed to the shaft portion 7*a* of the wrist 7, is accommodated in a cylindrical accommodation portion 39*a* of a mounting frame 39 which is fixed to the arm base frame 9 of the upper-front arm 6 by a screw 38. The cylindrical accommodation portion 39*a* has ends both of which are open, with a T-shaped connecting frame 39*b* being formed at one of the ends. The connecting frame 39*b* is fixed to the core member 16 by a screw 40 via the second disc 18.

Thus, the reel 20 is fixed to the upper-front arm 6 (the other mating member for the relative rotation of the robot) via the connecting frame 39*b*. The connecting frame 39*b* is provided with a slit 39*c* for passing the extension 14*a* of the FPC board assembly 14 drawn out of the slit 18*b* of the second disc 18. The outer covers 10 mentioned above are fixed to the arm base frame 9 and the mounting frame 39 by a plurality of screws 41 to cover the mounting frame 39.

The connecting terminal 33 of the extension 14*a* at the end E1 of the FPC board assembly 14 drawn out of the second disc 18 of the wiring case 13 is fixed to a predetermined position in the upper-front arm 6. The connecting terminal 33 is connected, via a terminal to a cable, not shown, wired in the upper-front arm 6. The two connecting terminals 34 and 35 of the extensions 14*b* at the ends E2-1 and E2-2, respectively, of the FPC board assembly 14 drawn out to the side of the first disc 17 from the housing 15 of the wiring case 13 are fixed to predetermined positions in the wrist 7. The connecting terminals 34 and 35 are connected, via respective terminals, to cables, not shown, wired in the wrist 7.

In this way, the cable wired in the upper-front arm 6 and the cables wired in the wrist 7 are connected via the rotary joint wiring unit 12.

Hereinafter, the rotary operations obtained in the above configuration will be described. First, there is no relative rotation between the housing 15 and the reel 20 in the state where the wrist 7 is pausing without rotating relative to the upper-front arm 6. In this state, the FPC board assembly 14 is urged to restore to the state before being accommodated in the wiring case 13, i.e. to the unwound straight state. Therefore, as shown in FIG. 10, accompanying the restoration, the portion of the FPC board assembly 14 inside the slide aid 23 comes into contact with the slide aid 23 and the portion of the FPC board assembly 14 outside the slide aid 23 comes into contact with the inner peripheral surface of the housing 15. Also, accompanying the restoration again to the unwound straight state, the portion of the FPC board assembly 14 in the fold-back portion T inside the slide aid 23 comes into contact with the core member 16, leaving the slide aid 23.

From this state, the wrist 7 rotates relative to the upper-front arm 6. Accompanying this relative rotation, the housing 15 rotates relative to the reel 20 in the direction indicated by an arrow L in FIG. 9. In this case, the direction of the relative rotation of the housing 15 coincides with the direction towards the ends E2-1 and E2-2 (the side connected to the housing 15) from the FPC board assembly 14 in the fold-back portion T outside the slide aid 23. Therefore, the portion of the FPC board assembly 14 outside the slide aid 23 will be pulled in the direction of the arrow L. Then, the portion of the FPC board assembly 14 outside the slide aid 23 will be apart from the inner surface of the housing 15 and wound about the slide aid 23. At the same time, the fold-back portion T will pull the slide aid 23 to rotate the slide aid 23 in the direction of the arrow L.

In this case, the slide aid 23 rotates with the number of rotations approximately half of that of the housing 15. Accordingly, the portion of the FPC board assembly 14 inside the slide aid 23 will be unwound from the core member 16 and will be gradually led out of the slide aid 23, and thus will be gradually apart from the rollers 25. As a result, the portion of the FPC board assembly 14 outside the slide aid 23 will rotate in the direction of the arrow L in integration with the housing 15, with the portion of the FPC board assembly 14 led out from the inside of the slide aid 23 being permitted to be wound about the slide aid 23, i.e. being in contact with the rollers 25 to rotate the rollers 25.

Thus, when the housing 15 relatively rotates in the direction of the arrow L, the FPC board assembly 14 moves such that, inside the slide aid 23, it is unwound from the core member 16, and outside the slide aid 23, it is wound about the slide aid 23.

On the other hand, accompanying the relative rotation of the wrist 7 with respect to the upper-front arm 6, the housing 15 rotates relative to the reel 20 in the direction indicated by an arrow M in FIG. 10. In this case, the direction of the relative rotation of the housing 15 is opposite to the direction from the FPC board assembly 14 in the fold-back portion T outside the slide aid 23 towards the ends E2-1 and E2-2 of the FPC board assembly 14, which are connected to the housing 15. Therefore, the portion of the FPC board assembly 14 outside the slide aid 23 will be pushed by the housing 15.

Thus, the portion of the FPC board unit 15 outside the slide aid 23 will be loosened and be apart from the slide aid 23 to thereby come into contact with the inner surface of the housing 15 and thus to rotate in integration with the housing 15 in the direction of the arrow M. With this rotation, the portion of the FPC board assembly 14 outside the slide aid 23 will be unwound from the slide aid 23 in pause, and at the same time, the fold-back portion T will be apart from the roller 25 at the end E3 of the slide aid 23 and come into contact with the protective pole 26 at the end E4 thereof. In this case, since a side face of the protective pole 26 is formed into the arc concave surface 26*a* for the fold-back portion T to come into contact therewith, the fold-back portion T will not come off from the protective pole 26, whereby the protective pole 26 can be efficiently pushed.

When the protective pole 26 receives a pressing force from the fold-back portion T, the slide aid 23 will rotate in the direction of the arrow M. In this case, the number of rotations of the slide aid 23 will be approximately half of that of the housing 15. Therefore, the portion of the FPC board 14 outside the slide aid 23 will be kept being unwound from the slide aid 23, so that the unwound portion will be pushed into the slide aid 23. Thus, inside the slide aid 23, the portion of the FCP board 14 pushed there from outside will come into contact with the rollers 25 of the slide aid 23 and will be wound about the core member 16, while rotating the rollers 25.

In this way, when the housing 15 relatively rotates in the direction of the arrow M, the FPC board assembly 14 moves such that, inside the slide aid 23, it is wound about the core member, and outside the slide aid 23, it is unwound from the slide aid 23.

As described above, according to the rotary joint wiring unit 12 of the present embodiment, the portion between the end E1 and the ends E2-1 and E2-2 of the FPC board assembly 14 is flexibly bent so as to be wound about and unwound from the core member 16 and the slide aid 23, while the end E1 and the ends E2-1 and E2-2 are connected to the core member 16 and the housing 15, respectively. Thus, the relative rotation can be absorbed from between the housing 15 and the reel 20, and therefore between the wrist 7 and the upper-front arm 6. Therefore, the axial dimension of the wiring case 13 may be comparatively as small as a thickness that may only allow accommodation of the FPC board assembly 14. At the same time, the dimension in the radial direction may also be comparatively as small as a radial dimension that may only allow the FPC board assembly 14 to be wound about and unwound from the core member 16 and the slide aid 23. Therefore, the wiring case 13 can be disposed in a small space. In other words, the wiring case 13 can be used for a small robot having less extra space without making the robot larger, or even when the robot is made larger, the degree of enlargement may be very small.

Particularly, when a camera is selected as an end effector in a conventional configuration, the cable used for transmitting the pickup image signals of the camera has been vulnerable to twisting due to the use of the cable in which a core line is enclosed by a mesh conductor. Accordingly, as disclosed in the patent documents JP-A-H06-143186 and JP-A-H10-034588 mentioned above, it has been difficult to employ a configuration in which a sealed cable is disposed at the center portion of rotation of a rotary joint of a robot to absorb the relative rotation between two members of the robot by twisting the sealed cable. Therefore, use of a sealed cable has necessitated the use of the external wiring method. The use of the external wiring method has further necessitated provision of an extra space for the externally wired sealed cable. Thus, in performing a certain motion, robots using such a sealed cable have created a problem of limiting (narrowing) the motion area compared to those robots which are not provided with such an external cable and have an area of the same size.

In this regard, according to the present embodiment, relative rotation between two members of a robot is configured to be absorbed by flexibly bending the FPC board assembly 14. Specifically, the present embodiment uses an FPC board unit having a sealed structure instead of a coaxial cable structure. Thus, the cable for transmitting the image pickup signals can also be incorporated into the FPC board assembly 14 of the rotary joint wiring unit 12, realizing use of the internal wiring method.

Moreover, the slide aid 23 is arranged between the housing 15 and the core member 16 so as to be rotatably movable. Therefore, when the FPC board assembly 14 receives a pressing force with the relative rotation of the housing 15, the PCT board assembly 14 is supported by the housing 15 and the slide aid 23, or by the core member 16 and the slide aid 23 to prevent the FPC board assembly 14 from being buckled. Thus, the FPC board assembly 14 can be effectively prevented from being entangled within the wiring case 13.

In addition, when the housing 15 rotates relative to the reel 20, the FPC board assembly 14 moves so as to be wound about and unwound from the slide aid 23, while being in contact with the slide aid 23. Since the contact with the slide aid 23 is actually the contact with the rollers 25, the contact is actually a rolling contact that will decrease friction and wearing. Thus, the FPC board assembly 14 will be smoothly wound about and unwound from the slide aid 23, while allowing the slide aid 23 to rotate smoothly.

In the winding and unwinding motion of the FPC board assembly 14, the FPC board assembly 14 will not be buckled or entangled, owing to the presence of the slide aid 23. In addition, the FPC board assembly 14 achieves a rolling contact with the slide aid 23 via the rollers 25 to reduce friction and wearing. As a result, the FPC board assembly 14 can be wound about and unwound from the slide aid 23, while allowing the slide aid 23 to rotate smoothly. Therefore, the industrial robot 1 can be continuously operated for a long time, with the wrist 7 pivotally rotating at high speed with respect to the upper-front arm 6. In realizing such a long-time use, the FPC board assembly 14 is prevented, as much as possible, from being problematically entangled or quickly worn out.

Additionally, in the present embodiment, since the width of the rotary plate 24 is made smaller than the diameter of each roller 25, there is no potential for the FPC board assembly 14 to be in contact with the rotary plate 24. Also, of the ends E3 and E4 of the rotary plate 24, the end E3, i.e. the end located inside the fold-back portion T, is provided with a roller 25. Therefore, when the FPC board assembly 14 in the fold-back portion T pulls the slide aid 23 for rotation, the fold-back portion T comes into contact with the roller 25 concerned. Thus, the FPC board assembly 14 is configured to be wound about and unwound from the slide aid 25, while being in contact with the rollers 25. Therefore, low-frictional (low-wear) contact of the FPC board assembly 14 with the slide aid 23 can be more reliably achieved.

In the present embodiment, the protective pole 26 is provided at a position deviated to the side of the outer periphery of the rotary plate 24. Thus, such a concern can be prevented as much as possible that the gap between the core member 16 and the protective pole 26 becomes large to have the fold-back portion T pulled into the gap.

Specifically, when the housing 15 is rotated in the direction of the arrow M as shown in FIG. 10 and then reversely rotated in the direction of the arrow L as shown in FIG. 9, the slide aid 23 may also be rotated in the direction of the arrow L to allow the protective pole 26 to push the FPC board assembly 14 in the fold-back portion T. In this case, the FPC board assembly 14 may be softened due to the increase of the temperature as a result of long-time operation, or grease may have been coated on the core member 16 and the FPC board assembly 14 to reduce the frictional coefficient. Under these conditions, the FPC board assembly 14 may be in intimate contact with the core member 16 or with the FPC board assembly 14 wound about the core member 16. As a result, the fold-back portion T may be curved to enter the gap between the core member 16 and the protective pole 26 as indicated by the dash-dot-dot line in FIG. 11.

In this case, if the protective pole 26 has not been set up being deviated to the outer peripheral edge of the rotary plate 24 but has been set up covering the entire width of the rotary plate 24, the gap between the core member 16 and the protective pole 26 will be narrow. As a result, the portion "t" of the fold-back portion T curved to enter the narrow gap (hereinafter revered to as "curved protrusion") between the core member 16 and the protective pole 26 is undesirably pulled into the narrow gap.

However, with the present embodiment, since the gap between the core member 16 and the protective pole 26 is ensured to be wide, the curved protrusion "t" can be prevented from being pulled into the gap between the core member 16 and the protective pole 26.

In the present embodiment, since the FPC board assembly 14 is made of plastic (e.g., polyimide resin) and thus has low frictional properties, the progress of wearing in the front and rear of the FPC board assembly 14 is very slow, enabling it to endure use over a long period of time. It is true that, when the housing 15 rotates relative to the reel 20, the plurality of FPC boards 14-1 and 14-2 laid one over the other is slightly in friction. In the actual use, however, the low frictional properties coupled with the application of oil, will contribute to the very slow progress of wearing.

Moreover, the FPC board assembly 14 is configured such that the signal FPC boards 14-2 having the narrow-width signal lines 27-2 are sandwiched between the power FPC boards 14-1 having the wide-width power lines 27-1. Therefore, even when the FPC board assembly 14 is damaged being in contact with the rollers 25, housing 15, core member 16, and the like, the narrow-width signal lines 27-2 can be prevented from being disconnected at an earlier stage. Accordingly, under the conditions where the wrist 7 is in high-speed relative rotation or operated for a long time, the FPC board unit can be prevented from being quickly damaged to thereby achieve a long life.

In the present embodiment, the radial ribs 17d are formed in the inner surface of the first disc 17. Therefore, the winding and unwinding motions of the FPC board assembly 14 are carried out with the FPC board assembly 14 being slidably in contact with the radial ribs 17d. Accordingly, compared to the case where the FPC board assembly 14 is in contact with the inner surface of the first disc 17, the wearing of the FPC board assembly 14 can be reduced.

In fact, the second disc 18 is not provided with such radial ribs in its inner surface. As described above, the FPC board assembly 14 located inside the wiring case 13 has the ends E2-1 and E2-2 at the respective tips of which the extensions 14b are formed for connection with the housing 15. It is considered that the reason why the second disc 18 is not provided with radial ribs is because the FPC board assembly 14 is pulled to the side of the first disc 17 via the extensions 14b and thus tends to be in contact with the inner surface of the first disc 17 while being in less contact with the inner surface of the second disc 18. As a matter of course, the second disc 18 may be provided with radial ribs at its inner surface.

In the present embodiment, the wiring case 13 is provided with the housing 15, first disc 17 and second disc 18, which are made of transparent plastic. Therefore, if only the outer covers 10 are detached in conducting periodic checks, the conditions of the FPC board assembly 14 inside the wiring cover 13 can be visually checked. Thus, the periodic checks such as on the entangling and wearing conditions or the occurrence of disconnection of the FPC board assembly 14, can be readily conducted without the necessity of detaching the rotary joint wiring unit 12 from the rotary joint.

The present invention is not limited to the first embodiment described above and illustrated in the drawings. The present invention may be extended or modified as set forth below.

The plastic films of the FPC board assembly 14 are not limited to polyimide films, but may be PET (polyethylene terephthalate) films or other types of resin materials, such as polyamide resin. The length of the power FPC boards 14-1 may not be necessarily be differentiated from that of the signal FPC boards 14-2. The guide groove 22 of the slide aid 23 may be formed on the side of the second disc 18. In addition, the protective pole 26 may be formed to extend over the entire width of the rotary plate 24.

Second Embodiment

Figure 12:
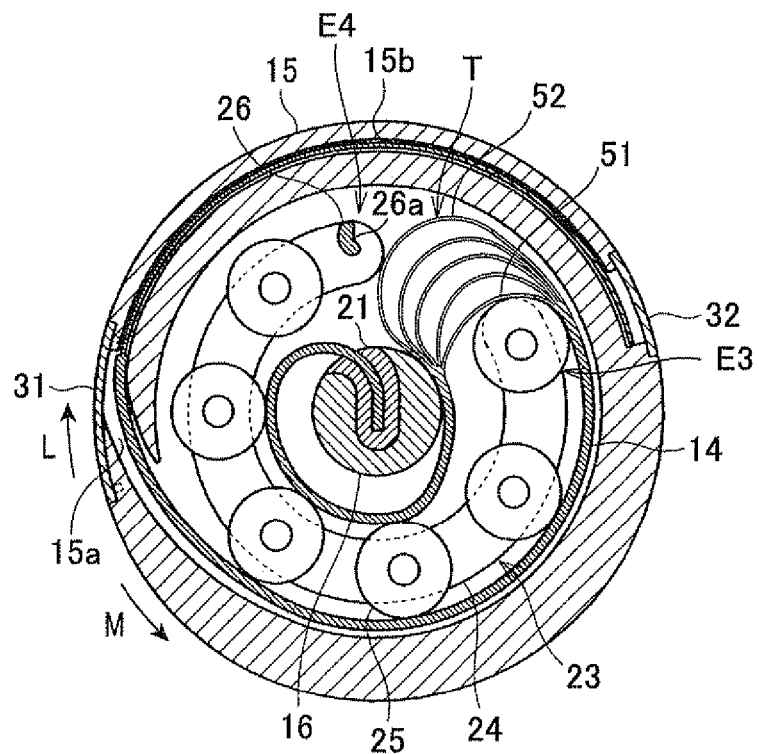
FIG. 12 is a vertical cross-sectional view illustrating a body of a rotary joint wiring unit, according to a second embodiment of the present invention.

Referring now to FIG. 12, hereinafter will be described a second embodiment of the present embodiment. In the second and the subsequent embodiments, the components identical with or similar to those in the first embodiment are given the same reference numerals for the sake of omitting explanation.

FIG. 12 is a vertical cross-sectional view illustrating a body of a rotary joint wiring unit, according to the second embodiment. As shown in FIG. 12, similar to the first embodiment, the FPC board assembly 14 is provided with an arc fold-back portion from where the winding direction of the FPC board assembly 14 is reversed. In the present embodiment, an inner protective board 51 is further laid over the plurality of FPC boards 14-1 and 14-2 that are laid one over the other, so that the inner protective board 51 is located innermost in the arc fold-back portion T. Also, an outer protective board 52 is further laid over the plurality of FPC boards 14-1 and 14-2, so that the outer protective board 52 is located outermost in the arc fold-back portion T.

The inner protective board 51 is made up of a plastic film, such as a polyimide film or a polyester film, with its thickness being set to substantially the same as that of the power FPC board 14-1 or the signal FPC board 14-2. The inner protective board 51 has a tension (i.e. rigidity) substantially of the same level as that of the power FPC board 14-1 or the signal FPC board 14-2.

The outer protective board 52 is also made up of a plastic film, such as a polyimide film or a polyester film, with its thickness being made thicker than that of the inner protective board 51. The outer protective board 52 has a tension appropriately stronger than the tension of the inner protective board 51.

When the housing 15 rotates relative to the reel 20 in the direction shown in an arrow L in FIG. 12 in the configuration described above, the portion of the FPC board assembly 14 outside the slide aid 23 will be pulled in the direction of the arrow L. Thus, the FPC board assembly 14 outside the slide aid 23 will be apart from the inner surface of the housing 15 and wound about the slide aid 23. Meanwhile, inside the fold-back portion T, the inner protective board 51 of the FPC board assembly 14 will pull and rotate the slide aid 23 in the direction of the arrow L.

With this configuration, the inner protective board 51 is wound about the slide aid 23 to pull the slide aid 23. Accordingly, the FPC board assembly 14 will not be directly in contact with the slide aid 23, whereby wearing or the like of the FPC board assembly 14 can be prevented.

On the other hand, when the housing 15 rotates relative to the reel 20 in the direction opposite to the direction of the arrow L in FIG. 12, i.e. in a direction indicated by an arrow M, the portion of the FPC board assembly 14 outside the slide aid 23 will be pushed by the housing 15. Thus, the portion of the FPC board assembly 14 outside the slide aid 23 will be loosened, be part from the slide aid 23, and be in contact with the inner surface of the housing 15 for rotation in the direction of the arrow M in integration with the housing 15. With this rotation, the portion of the FPC board assembly 14 outside the slide aid 23 will be unwound from the slide aid 23 in pause.

At the same time, in the fold-back portion T, the outer protective board 52 of the FPC board assembly 14 will be apart from the roller 25 at the end E3 of the slide aid 23 to contact and push the protective pole 26 at the end E4. Then, when the protective pole 26 receives a pressing force from the fold-back portion T, the slide aid 23 will rotate in the direction of the arrow M. In this case, the FPC board assembly 14 moves such that, inside the slide aid 23, it is wound about the core member 16, and outside the slide aid 23, it is unwound from the slide aide 23.

With the configuration described above, the outer protective board 52 is configured to contact and press the protective pole 26 of the slide aid 23. Therefore, the FPC board assembly 14 will no longer be directly in contact with the protective pole 26, whereby wearing or the like of the FPC board assembly 14 can be prevented.

If the rigidity of the outer protective board 52 is low, the outer protective board 52 in the fold-back portion T, after being in contact with the protective pole 26, will curves further (i.e. cannot keep the curved shape as it is, which shape has been achieved at the time of contacting the protective pole 26). Thus, the curved portion is in danger of being pulled into the gap between the core member 16 and the rollers 25 (or the gap between the rollers 25 and the housing 15).

In this regard, in the present embodiment, the rigidity of the outer protective board 52, per se, is ensured to be well strengthened, so that the outer protective board 52 has no excessive curved portion and is prevented from being pulled into the above gap.

The other parts of the body of the rotary joint wiring unit of the second embodiment are configured in the same manner as in the first embodiment. Accordingly, in the second embodiment as well, substantially the same advantages as in the first embodiment can be obtained.

In the second embodiment described above, the inner and outer protective boards 51 and 52 have been made up of plastic films. Alternatively, these protective boards may each be made up, for example, of the power FPC board 14-1 or the signal FPC board 14-2. In such a configuration, however, it is desirable that no current or signal is passed through the conductive lines of the power FPC board 14-1 or the signal FPC board 14-2 serving as the inner or outer protective board 51 or 52.

Third Embodiment

Referring to FIG. 13 and FIGS. 14A to 14C, hereinafter will be described a third embodiment.

Figure 13:
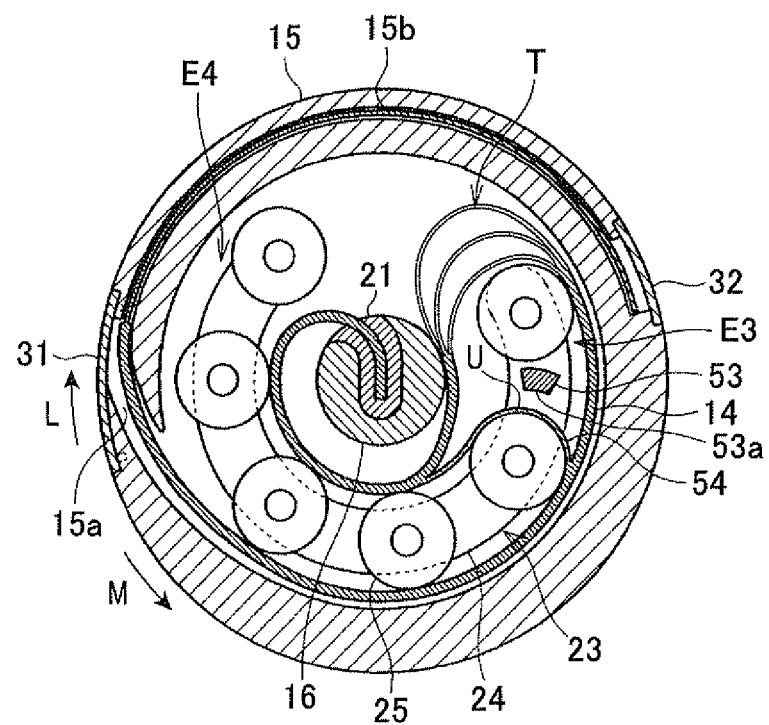
FIG. 13 is a vertical cross-sectional view illustrating a body of a rotary joint wiring unit, according to a third embodiment of the present invention.

FIG. 13 is a vertical cross-sectional view illustrating a body of a rotary joint wiring unit, according to the third embodiment. As shown in FIG. 13, a substantially rectangular drive projection 53 is set up at the portion between two rollers 25 at the end E3 of the rotary plate 24 of the slide aid 23. The lower surface, as viewed in FIG. 13, of the drive projection 53 is shaped into an arc concave surface 53a.

In the third embodiment, the end E4 of the rotary plate 24 is not provided with the protective pole 26, but the rotary plate 24 is shortened by the length corresponding to the length required for providing the protective pole 26. Thus, the rotary plate 24 is ensured to have a larger length between the ends E3 and E4.

In the third embodiment, as shown in FIG. 13, a flexible driving film sheet 54 is further laid over the plurality of FPC boards 14-1 and 14-2 that are laid one over the other, so that the driving film sheet 54 will be located innermost in the arc fold-back portion T. The driving film sheet 54 is made up of a plastic film, such as a polyimide film or a polyester film, with its thickness being substantially the same as that of the power FPC board 14-1 or the signal FPC board 14-2. The driving film sheet 54 has a tension (i.e. rigidity) substantially of the same level as that of the power FPC board 14-1 or the signal FPC board 14-2. The thickness of the driving film sheet 54 may be made larger than that of the power FPC board 14-1 or the signal FPC board 14-2 to provide a configuration having an appropriately strong tension.

As shown in FIG. 13, the FPC board assembly 14, when it is accommodated in the wiring case 13, is configured to be located in the same manner as in the first embodiment, except a portion of the driving film sheet 54. Specifically, a portion of the driving film sheet 54, i.e. the portion of a fold-back portion U shown in FIG. 13, is accommodated in the wiring case 13 so as to be positioned between the second roller 25 from end E3 of the slide aid 23 and the drive projection 53.

In this case, the length of the driving film sheet 54 is set to be shorter than that of the FPC board assembly 14, so that the FPC board assembly 14 and the driving film sheet 54 can be accommodated in the wiring case 13 as described above.

Figure 14A:
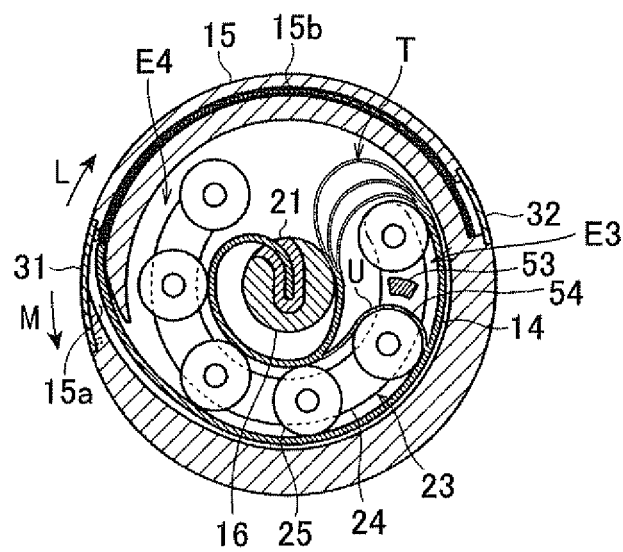
FIGS. 14A to 14C are vertical cross-sectional views each illustrating the movement of the rotary joint wiring unit according to the third embodiment.
Figure 14B:
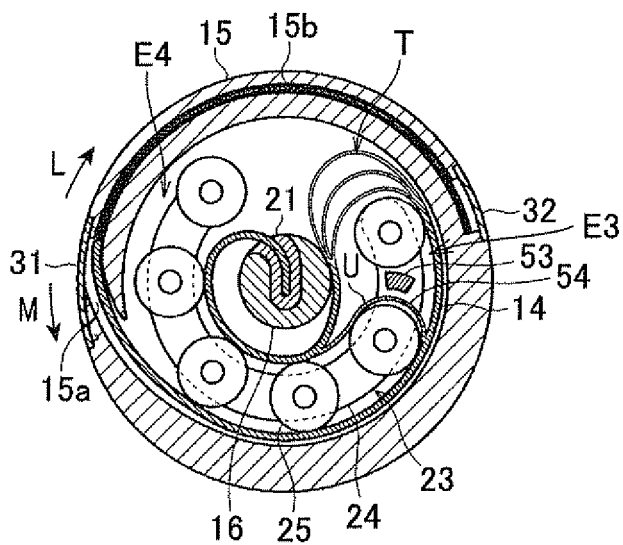
Figure 14C:
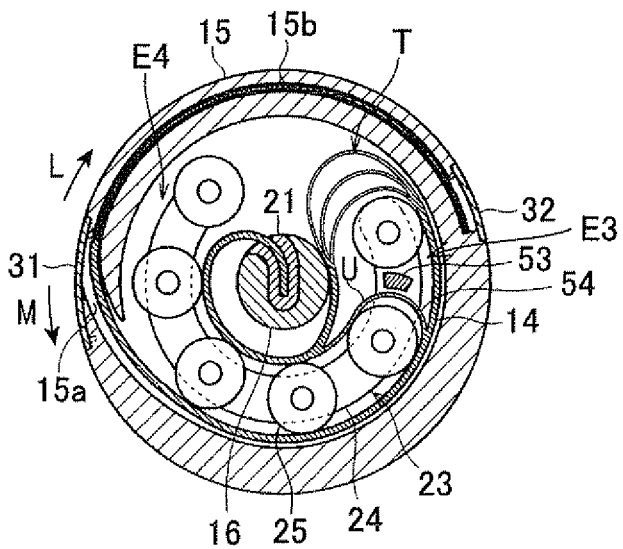

Referring to FIGS. 14A to 14C, the operations of the rotary joint wiring unit according to the present embodiment will now described. FIGS. 14A to 14C are vertical cross-sectional views illustrating the operation of the rotary joint wiring unit of the present embodiment.

First, referring to FIG. 14A, the operation of the rotary joint wiring unit of the present embodiment is described in the case where, first, the housing 15 rotates relative to the reel 20 in the direction indicated by an arrow M in FIG. 14A, with the driving film sheet 54 being wound about the roller 25 at the end E3 of the slide aid 23. With the rotation of the housing 15 in the direction of the arrow M, the portion of the FPC board assembly 14 outside the slide aid 23 will be pushed by the housing 15. Thus, the portion of the FPC board 14 outside the slide aid 23 will be loosened, be apart from the slide aid 23, and be in contact with the inner surface of the housing 15 for rotation in the direction of the arrow M in integration with the housing 15.

With this rotation, the portion of the FPC board 14 outside the slide aid 23 will be unwound from the slide aid 23 which is in pause. Meanwhile, the driving film sheet 54 disposed inner side of the FPC board assembly 14 and positioned in the fold-back portion U is permitted to be apart from the second roller 25 from the end E3 of the slide aid 23 (see FIG. 14B). After that, with the further rotation of the housing 15 relative to the reel 20 in the direction of the arrow M, the drive film 54 in the fold-back portion U will contact and push the arc concave surface 53a of the drive projection 53 of the slide aid 23. Then, when the drive projection 53 receives a pressing force from the driving film sheet 54 in the fold-back portion U, the slide aid 23 will rotate in the direction of the arrow M. In this case, the FPC board assembly 14 moves such that, inside the slide aid 23, it is wound about the core member 16, and outside the slide aid 23, it is unwound from the slide aid 23.

With the configuration described above, the driving film sheet 54 is configured to contact and push the drive projection 53 of the slide aid 23. Therefore, the FPC board assembly 14 will no longer be directly in contact with the rollers 25 of the slide aid 23, whereby the wearing or the like of the FPC board assembly 14 can be prevented.

It is likely that the driving film sheet 54 will eventually become worn because the driving film sheet 54 is configured to contact and push the drive projection 53. However, since the driving film sheet 54 is dedicated to driving the rotary operations and does not carry power or signals, the possible wearing of the driving film sheet 54 will not cause serious problems. Also, the driving film sheet 54, which is not required to carry signals or power, is not required to have insulation properties. Thus, the material or the thickness of the driving film sheet 54 can be determined as desired. Accordingly, the driving film sheet 54 may have a large thickness, or may be made of a less expensive material having high resistance to wearing. Thus, a board having high resistance to wearing can be used as the driving film sheet 54.

If the tension of the driving film sheet 54 is weak (or if the speed of the relative rotation between the housing 15 and the reel 20 is high), the driving film sheet 54 in the fold-back portion U, after being in contact with the drive projection 53, may be inflated outward in the fold-back direction (i.e. cannot keep the curved shape as it is, which shape has been achieved at the time of contacting the drive projection 53). Hence, the curved portion may be undesirably pulled into the gap between the rollers 25 and the housing 15 (or the gap between the core member 16 and the rollers 25).

In this regard, in the present embodiment, the tension (rigidity) of the driving film sheet 54 is ensured to be well strengthened (e.g., the tension) is set to a level equal to or stronger than that of the FPC board assembly 14), so that the curved portion will not be formed in the driving film sheet 54, which curved portion may otherwise be pulled is into the above gap. In this case, the rigidity the driving film sheet 54 depends on the material or the thickness of the driving film sheet 54 (i.e. the larger the thickness is, the stronger the tension will be). Accordingly, the material and the thickness of the driving film sheet 54 may only have to be adjusted to obtain required intensity of tension.

Referring to FIG. 14C, the operation is described in the case where the housing 15 rotates relative to the reel 20 in the direction opposite to the direction indicated by the arrow M, i.e. in the direction indicated by an arrow L, with the driving film sheet 54 being in contact with the drive projection 53 of the slide aid 23 (see FIG. 14C). With the rotation of the housing 15 in the direction of the arrow L, the portion of the FPC board assembly 14 outside the slide aid 23 will be pulled in the direction of the arrow L, and thus the driving film sheet 54 located inner side of the FPC board assembly 14 and positioned in the fold-back portion U will be apart from the arc concave surface 53a of the drive projection 53 (see FIG. 14B).

After that, with the further rotation of the housing 15 relative to the reel 20 in the direction of the arrow L, the driving film sheet 54 in the fold-back portion U will be wound about the second roller 25 from the end E3 of the slide aid 23, and will pull the roller 25 concerned as well as the slide aid 23 to rotate the slide aid 23 in the direction of the arrow L (see FIG. 14A).

With this configuration, the driving film sheet 54 is configured to be wound about the second certain roller 25 of the slide aid 23 to pull the second roller 25, i.e. the slide aide 23. Thus, the FPC board assembly 14 will no longer be directly in contact with the rollers 25, whereby the wearing or the like of the FPC board assembly 14 can be prevented.

It is likely that the driving film sheet 54 becomes worn out because the driving film sheet 54 is configured to be wound about the second roller 25. However, since the driving film sheet 54 is dedicated to driving the rotary operations and does not carry power or signals, the possible wearing of the driving film sheet 54 will not cause serious problem. Also, the driving film sheet 54, which is not required to carry signals or power, is not required to have insulation properties. Thus, the material or the thickness of the driving film sheet 54 can be determined as desired. Accordingly, the driving film sheet 54 may have a large thickness, or may be made of a less expensive material having high resistance to wearing. Thus, a board having high resistance to wearing can be used as the driving film sheet 54.

In the third embodiment, the end E4 of the rotary plate 24 is not provided with the protective pole 26 to decrease the length of the end E4 by the length corresponding to the length required for providing the protective pole 26, but to increase the distance between the ends E3 and E4 of the rotary plate 24. Thus, the number of the FPC boards 14-1 and 14-2 may be increased.

In the third embodiment, the configuration other than the configuration described above is the same as the configuration in the first embodiment. Accordingly, in the third embodiment as well, substantially the same advantages as in the first embodiment can be obtained.

In the third embodiment, the driving film sheet 54 has been made up of a plastic film. Alternatively, the driving film sheet 54 may be made up, for example, of the power FPC board 14-1 or the signal FPC board 14-2. In such a configuration, however, it is desirable that no current or signal is passed through the conductive lines of the power FPC board 14-1 or the signal FPC board 14-2 as the driving film sheet 54.

Fourth Embodiment

Figure 15A:
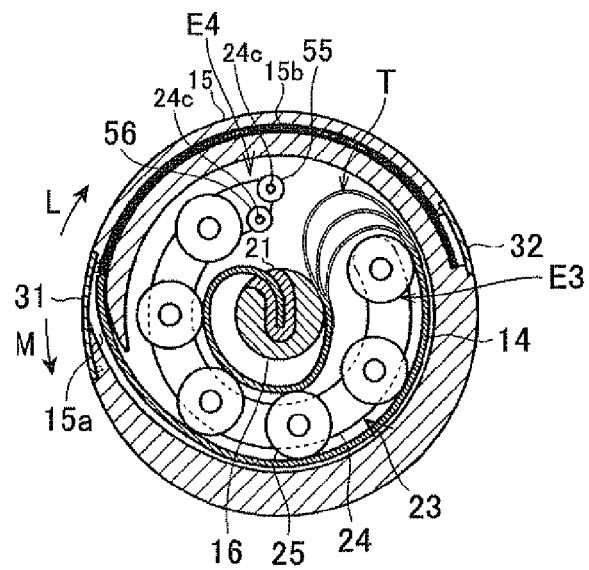
FIGS. 15A to 15C are vertical cross-sectional views each illustrating the movement of a rotary joint wiring unit, according to a fourth embodiment of the present invention.
Figure 15B:
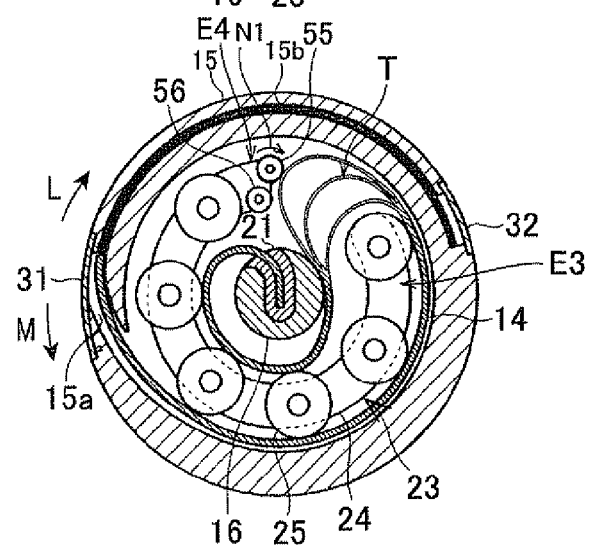
Figure 15C:
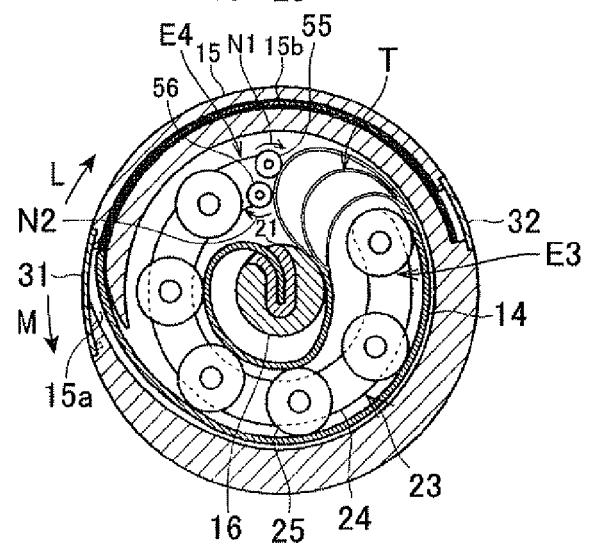

Referring to FIGS. 15A to 15C, a fourth embodiment is described.

FIGS. 15A to 15C are vertical cross-sectional views illustrating the operation of a rotary joint wiring unit according to the fourth embodiment.

In the fourth embodiment, as shown in FIG. 15A, the end E4 of the rotary plate 24 of the slide aid 23 is rotatably provided with two small-diameter protective rollers 55 and 56, instead of the protective pole 26, via respective shafts 24c and 24c. The two protective rollers 55 and 56 are arranged along the widthwise direction of the rotary plate 24.

With this configuration, as shown in FIG. 15A, when the housing 15 rotates relative to the reel 20 in the direction indicated by an arrow M, the portion of the FPC board assembly 14 outside the slide aid 23 will be pushed by the housing 15. Thus, the portion of the FPC board assembly 14 outside the slide aid 23 will be loosened, be apart from the slide aid 23, and be in contact with the inner surface of the housing 15 for rotation in the direction of the arrow M in integration with the housing 15.

With this rotation, the portion of the FPC board assembly 14 outside the slide aid 23 will be unwound from the slide aid 23 in pause.

Meanwhile, the FPC board assembly 14 in the fold-back portion T will be apart from the roller 25 at the end E3 of the rotary plate 24 of the slide aid 23, and will be in contact, first, with the outer protective roller 55 of the two protective rollers 55 and 56 at the end E4 so as to be driftingly drawn to the lower side (inner peripheral side) as viewed in FIG. 15B.

Thus, the FPC board assembly 14 in the fold-back portion T will be unlikely to be pulled into the gap between the protective roller 55 and the housing 15. Also, when the FPC board assembly 14 in the fold-back portion T contacts and pushes the protective roller 55, the protective roller 55 will rotate in the direction indicated by an arrow N1 in FIG. 15B. Thus, the sliding resistance will be lessened between the FPC board assembly 14 in the fold-back portion T and the protective roller 55.

Subsequently, as shown in FIG. 15C, with the further relative rotation of the housing 15 in the direction of the arrow M, the FPC board assembly 14 in the fold-back portion T will also contact and push the inner protective roller 56 of the two protective rollers 55 and 56. In this case, the protective roller 56 will rotate in the direction indicated by an arrow N2 in FIG. 15C. Thus, the sliding resistance will be lessened between the FPC board assembly 14 in the fold-back portion T and the protective roller 56.

The two protective rollers 55 and 56 are ensured to be arranged such that the FPC board assembly 14 in the fold-back portion T, when comes into contact with the two rollers 55 and 56, may first contact the outer roller 55 and then, a little later, contact the inner roller 56. Thus, the two protective rollers 55 and 56 will receive a pressing force from the fold-back portion T to rotate the slide aid 23 in the direction of the arrow M.

With the configuration described above, the FPC board assembly 14 in the fold-back portion T contacts and pushes the two protective rollers 55 and 56 of the slide aid 23. Accordingly, compared to the configuration in which the FPC board assembly 14 comes into contact with the protective pole 26 of the slide aid 23, the sliding resistance between the FPC board assembly 14 and the protective rollers 55 and 56 is reduced (i.e. the friction is reduced), by an amount corresponding to one free rotation of the protective rollers 55 and 56. Therefore, the wearing or the like of the FPC board assembly 14 can be further prevented.

In particular, in the fourth embodiment, the FPC board assembly 14 in the fold-back portion T, when comes into contact with the two protective rollers 55 and 56, is configured to contact the outer roller 55 first and then, a little later, contact the inner roller 56. With this configuration, the FPC board assembly 14 in the fold-back portion T, when it first contacts the outer roller 55, is driftingly drawn to the lower side as viewed in FIG. 15B. Thus, the FPC board assembly 14 in the fold-back portion T will be unlikely to be pulled into the gap between the protective roller 55 and the housing 15. As a result, the fold-back portion T can be prevented from being pulled into the above gap.

In the fourth embodiment, the configuration other than the configuration described above is the same as the configuration in the first embodiment. Accordingly, in the fourth embodiment as well, substantially the same advantages as in the first embodiment can be obtained.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A wiring unit for robots having a rotary joint with which two members are mutually rotatably coupled, an electronic wiring passing through the two members and the rotary joint, the wiring unit comprising:
a wiring case comprising i) a cylindrical housing whose both ends are opened in an axial direction of the housing and ii) a reel a) having a cylindrical core member located in an inner space of the housing and the reel comprising two lid members mutually integrated with the core member and located on both axial end sides of the inner space of the housing, and b) being relatively rotatable to the housing, the housing and the reel respectively being linked respectively with the two members of the robot;
a slide aid comprising
an annular rotary plate i) having both ends which produce a vacant space therebetween, ii) being placed to surround the core member in a radial direction of the housing, and iii) being rotatable about the core member, and
a plurality of rollers provided on the rotary plate to be located around the core member and rotatable about an axis thereof; and
a flexible printed wiring board, which is belt-shaped, in which a plurality of electrically conductive wires for the electrical wiring are contained with electrical insulation therebetween, and which has i) two length-width end portions one of which is linked with the core member and the other of which is linked with the housing and ii) a rest portion other than the two length-width end portions, which is located within the inner space of the housing, is wound and unwound in inside and outside spaces of a set of the rollers in the radial direction via the vacant space such that that the rest portion is moved on and along the rollers and is wound and unwound oppositely in directions between the inside and the outside spaces of the set of the rollers in the radial direction,
wherein the flexible printed wiring board is folded back via the vacant space left by the rotary plate so that the flexible printed wiring board has an arc folded-back portion which changes a winding direction thereof in the vacant space, and is provided with an outer protective board made up of a polyimide film which is laid over the flexible printed wiring board so that the outer protective board is located outermost in the arc fold-back portion.

2. The wiring unit of claim 1, wherein each of the rollers has an outer diameter and the rotary plate has a width in the radial direction and the outer diameter is larger than the width.

3. The wiring unit of claim 2, wherein the flexible printed wiring board is folded back via the vacant space left by the rotary plate so that the flexible printed wiring board has an arc folded-back portion which changes a winding direction thereof in the vacant space, and a roller among the plurality of rollers is provided at one end of both ends of the rotary plate, the arc folded-back portion being wound around the one end of both ends of the rotary plate,
further comprising a protective pole provided at the other end of both ends of the rotary plate, wherein the protective pole has an arc concave surface which faces and accepts the arc folded-back portion for protecting the arc folded-back portion.

4. The wiring unit of claim 3, wherein the protective pole is biased outward in the axial direction on the rotary plate.

5. The wiring unit of claim 2, wherein the flexile flexible printed wiring board is composed of a plurality of flexible printed wiring board layers overlapped on one another.

6. The wiring unit of claim 5, wherein
the flexible printed wiring board is folded back via the vacant space produced by the rotary plate so that the flexible printed wiring board has an arc folded-back portion which changes a winding direction thereof in the vacant space, and
the flexible printed wiring board has a flexible film board applied to thereto such that the flexible film board is located most inwardly in the folded-back portion.

7. The wiring unit of claim 6, further comprising:
a projection fixedly located between mutually adjacent two rollers among the plurality of rollers, wherein the two rollers are located from one end of both ends of the rotary plate and composed of a first roller and a second roller in this order from the one end, and the flexible printed wiring board has an arc folded-back portion which changes a winding direction thereof around the two rollers,
wherein the arc folded-back portion of the flexible film board is located between the projection and the second roller and the flexible printed wiring board layers are located around the first roller via the vacant space produced between both ends of the rotary plate.

8. The wiring unit of claim 7, wherein
the flexible film board is first wound around the second roller before the flexible printed wiring board layers are wound around the first roller in response to a relative rotation between the reel and the housing to have the flexible printed wiring board wound around the rollers, and the flexible film board is first touched to the projection before the arc folded-back portion of the flexible printed wiring board is made to touch a roller provided on the other end of the rotary plate by being unwound, in response to a relative rotation between the reel and the housing to have the flexible printed wiring board unwound around the rollers.

9. The wiring unit of claim 8, wherein the protrusion has a side to which the arc folded-back portion of the flexible film board is made to touch and the side of the protrusion has an arc concave surface to accept the arc folded-back portion.

10. The wiring unit of claim 2, wherein the plurality of rollers include a roller provided on one end of both ends of the rotary plate, the flexible printed wiring board being folded back from the radial inside of the set of rollers to the radial outside of the set of rollers around the roller provided on the one end, the wiring unit further comprising two protective rollers provided on the other end of both ends of the rotary plate, the two protective rollers aligning in a width direction of the rotary plate, each of the protective rollers is cylindrical and has a radius smaller than a radius of each of the rollers.

11. The wiring unit of claim 10, wherein each of the protective rollers rotates on an axis thereof.

12. The wiring unit of claim 10, wherein the two protective rollers consist of a first protective roller located outward in the radial direction and a second protective roller located inward in the radial direction and the second roller is positionally set back more than the first roller from the arc folded-back portion of the flexible film board.

13. The wiring unit of claim 12, wherein the two protective rollers consist of a first protective roller located outward in the radial direction and a second protective roller located inward in the radial direction and the two protective rollers are located such that the first protective roller first touches the arc folded-back portion and the second protective roller then touches the arc folded-back portion.

14. The wiring unit of claim 1, wherein the plurality of rollers are all of equal sizes and dimensions and located at equal arc intervals.

15. The wiring unit of claim 1, wherein the cylindrical core member is located at a center of a plane perpendicular to the axial direction of the housing.

16. The wiring unit of claim 1, wherein the flexible printed wiring board is folded back via the vacant space left by the rotary plate so that the flexible printed wiring board has an arc folded-back portion which changes a winding direction thereof in the vacant space, and a roller among the plurality of rollers is provided at one end of both ends of the rotary plate, the arc folded-back portion being wound around the one end of both ends of the rotary plate, further comprising a protective pole provided at the other end of both ends of the rotary plate, wherein the protective pole has an arc concave surface which faces and accepts the arc folded-back portion for protecting the arc folded-back portion.

17. The wiring unit of claim 1, wherein the flexible printed wiring board is composed of a plurality of flexible printed wiring board layers overlapped on one another.

18. The wiring unit of claim 17, wherein the flexible printed wiring board is folded back via the vacant space produced by the rotary plate so that the flexible printed wiring board has an arc folded-back portion which changes a winding direction thereof in the vacant space, and the flexible printed wiring board has a flexible film board applied to thereto such that the flexible film board is located most inwardly in the folded-back portion.

19. The wiring unit of claim 1, wherein the plurality of rollers include a roller provided on one end of both ends of the rotary plate, the flexible printed wiring board being folded back from the radial inside of the set of rollers to the radial outside of the set of rollers around the roller provided on the one end, the wiring unit further comprising two protective rollers provided on the other end of both ends of the rotary plate, the two protective rollers aligning in a width direction of the rotary plate, each of the protective rollers is cylindrical and has a radius smaller than a radius of each of the rollers.

20. The wiring unit of claim 1, wherein the flexible printed wiring board is provided with an inner protective board made up of a polyimide film which is laid over the flexible printed wiring board so that the inner protective board is located innermost in the arc fold-back portion.

* * * * *

UNITED STATES PATENT AND TRADEMARK OFFICE
CERTIFICATE OF CORRECTION

| | | |
|---|---|---|
| PATENT NO. | : 8,414,303 B2 | Page 1 of 1 |
| APPLICATION NO. | : 12/726005 | |
| DATED | : April 9, 2013 | |
| INVENTOR(S) | : Satoru Nakamura et al. | |

It is certified that error appears in the above-identified patent and that said Letters Patent is hereby corrected as shown below:

In the Claims:

In column 22, line 36, in claim 5, delete "flexile", therefor.

Signed and Sealed this
Second Day of July, 2013

Teresa Stanek Rea
*Acting Director of the United States Patent and Trademark Office*